United States Patent
Lieblich et al.

(10) Patent No.: US 12,322,032 B2
(45) Date of Patent: Jun. 3, 2025

(54) TECHNIQUES FOR GENERATING SYNTHETIC THREE-DIMENSIONAL REPRESENTATIONS OF THREATS DISPOSED WITHIN A VOLUME OF A BAG

(71) Applicant: Battelle Memorial Institute, Columbus, OH (US)

(72) Inventors: David Lieblich, Worcester, MA (US); John Tatarowicz, Blackwood, NJ (US); Rodney Hallgren, Philadelphia, PA (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 93 days.

(21) Appl. No.: 17/591,939

(22) Filed: Feb. 3, 2022

(65) Prior Publication Data

US 2022/0245886 A1 Aug. 4, 2022

Related U.S. Application Data

(60) Provisional application No. 63/145,417, filed on Feb. 3, 2021.

(51) Int. Cl.
*G06T 15/08* (2011.01)
*G06V 20/52* (2022.01)

(52) U.S. Cl.
CPC .............. *G06T 15/08* (2013.01); *G06V 20/52* (2022.01)

(58) Field of Classification Search
CPC . G06T 15/08; G06T 2219/2021; G06T 19/20; G06V 20/52; G06V 20/64
See application file for complete search history.

(56) References Cited

U.S. PATENT DOCUMENTS

| | | | |
|---|---|---|---|
| 6,947,521 | B2 | 9/2005 | Wernick et al. |
| 10,401,306 | B2 | 9/2019 | Li et al. |
| 10,697,903 | B2 | 6/2020 | Li et al. |
| 11,182,637 | B2 | 11/2021 | Akira |
| 2003/0233347 | A1* | 12/2003 | Weinberg ................ G06F 16/22 |
| 2008/0273772 | A1* | 11/2008 | Hu ............................ G06T 7/11 |
| | | | 382/128 |
| 2014/0161333 | A1* | 6/2014 | Litvin .................. G01N 23/046 |
| | | | 382/131 |

(Continued)

OTHER PUBLICATIONS

Najle Megherbi et al., "Radon transform based automatic metal artefacts generation for 3D threat image projection", Proc. SPIE 8901, Optics and Photonics for Counterterrorism, Crime Fighting and Defence IX; and Optical Materials and Biomaterials in Security and Defence Systems Technology X, 89010B (Oct. 16, 2013); https://doi.org/10.1117/12.2028506, 7 pages.

(Continued)

*Primary Examiner* — William A Beutel
(74) *Attorney, Agent, or Firm* — Grossman, Tucker, Perreault & Pfleger, PLLC; Donald G. Weiss

(57) ABSTRACT

In an approach to generating a synthetic three-dimensional (3D) X-ray volume, a first bag image of the plurality of bag images that includes an associated bag subvolume greater than a volume of a threat represented in a first threat image of the plurality of threat images is selected. An image is created based on inserting the threat of the first threat image into the associated bag subvolume of the first bag image.

16 Claims, 25 Drawing Sheets

(56) References Cited

U.S. PATENT DOCUMENTS

| | | | |
|---|---|---|---|
| 2016/0012647 A1* | 1/2016 | Chen | G06T 19/20 |
| | | | 382/203 |
| 2018/0106733 A1 | 4/2018 | Li et al. | |
| 2019/0369034 A1* | 12/2019 | Li | G06T 11/008 |
| 2020/0333266 A1 | 10/2020 | Li et al. | |
| 2022/0020203 A1* | 1/2022 | Paglieroni | G06T 7/0002 |

OTHER PUBLICATIONS

Najle Megherbi et al., "Fully Automatic 3D Threat Image Projection: Application to Densely Cluttered 3D Computed Tomography Baggage Images", https://www.researchgate.net/publication/236884403, Oct. 2012, 8 pages.

International Search Report and Written Opinion of International Application No. PCT/US22/15057, mail date Sep. 12, 2022.

* cited by examiner

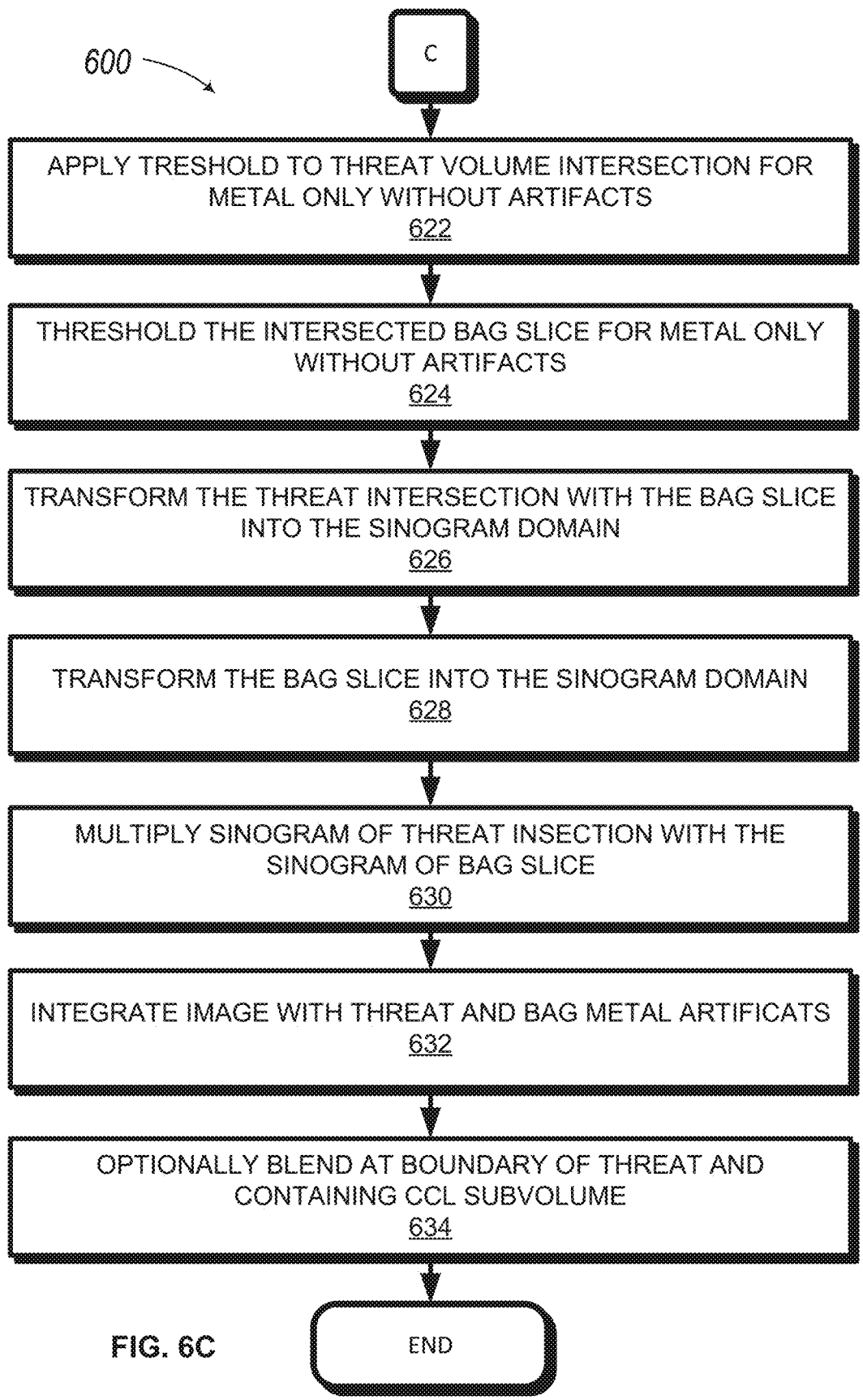

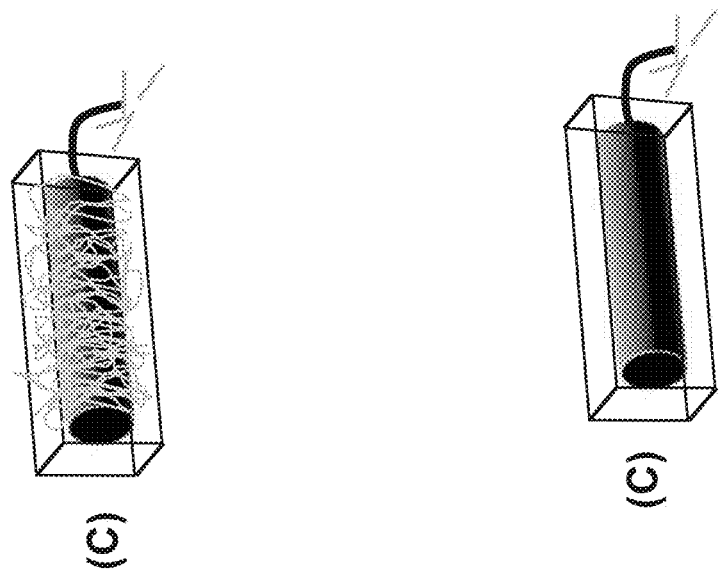
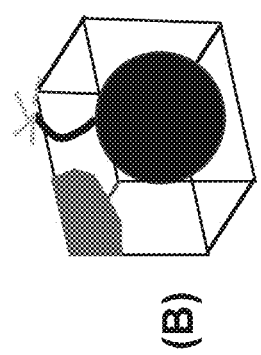
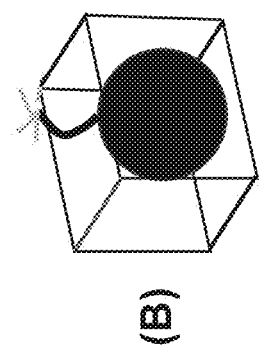
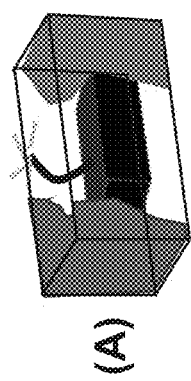
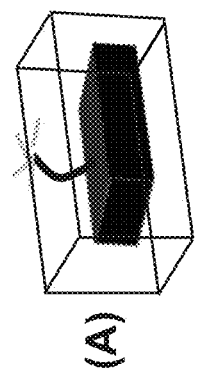
FIG. 15
FIG. 16

TECHNIQUES FOR GENERATING SYNTHETIC THREE-DIMENSIONAL REPRESENTATIONS OF THREATS DISPOSED WITHIN A VOLUME OF A BAG

CROSS-REFERENCE TO RELATED APPLICATIONS

The present application claims the benefit of the filing date of U.S. Provisional Application Ser. No. 63/145,417, filed Feb. 3, 2021, the entire teachings of which applications are hereby incorporated herein by reference.

TECHNICAL FIELD

The following disclosure relates generally to aviation security and, more particularly, to systems and methods to generating a synthetic three-dimensional (3D) X-ray volume by inserting a 3D X-ray volume of a first object into the 3D X-ray volume of a second object.

BACKGROUND

Present aviation security protocols include 3D X-ray CT scanners that generate image data for trained human scanners, e.g., TSA officers, to identify dangerous threats within bags and luggage. Adequate training of such individuals is important to ensuring passenger safety. However, such training requires a relatively large number of 3D images to be presented that include both bags with non-threatening objects as well as bags carrying threatening objects.

Likewise, computer-aided scanning processes that seek to identify and/or classify potential threats also require a large amount of 3D image data for training. However, acquisition of such 3D image data raises numerous, non-trivial challenges.

SUMMARY

In one illustrative embodiment, a system for generating a synthetic three-dimensional (3D) image comprises: a memory having a plurality of bag images and a plurality of threat images; one or more controllers; one or more non-transitory computer readable storage media; and program instructions stored on the one or more non-transitory computer readable storage media for execution by at least one of the one or more controllers. A first bag image of the plurality of bag images that includes an associated bag subvolume greater than a volume of a threat represented in a first threat image of the plurality of threat images is selected. An image is created based on inserting the threat of the first threat image into the associated bag subvolume of the first bag image.

In another illustrative embodiment, a first 3D X ray volume of a first object is selected. A synthetic 3D X ray volume is created by inserting a second 3D X ray volume of a second object into the first 3D X ray volume of the first object.

BRIEF DESCRIPTION OF THE DRAWINGS

In the drawings, identical reference numbers identify similar elements or operations. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings.

FIGS. 6A-6D show another example process for implementing one or more stages of the example image generation pipeline of FIG. 2, in accordance with aspects of the present disclosure.

FIG. 15 shows various example threats and eigenboxes/bounding boxes for use by systems and methods consistent with the present disclosure.

FIG. 16 shows the various example threats of FIG. 15 after filtering/thresholding consistent with aspects of the present disclosure.

DETAILED DESCRIPTION

Synthetic data generation is advantageous in many applications where a relatively deep understanding of a process is required and such understanding is computationally expensive, time consuming, and impractical to acquire without large amounts of input data (e.g., measured in the terabytes to petabytes).

One example of such an application is aviation security, where the detection algorithms on 3D X-ray CT scanners need to be developed and/or tested to ensure traveler safety. It is costly, time consuming, and dangerous to collect images of the many different configurations of threats, such as explosives or an explosive device, that can be accommodated in passenger luggage.

There exists a need for systems and methods that utilize algorithms to generate 3D X-ray imagery for use by humans and/or machine learning that does not necessitate X-ray scans of actual threat objects within a bag/container.

Systems and methods are disclosed herein for the generation of 3D X-ray images through the use of previously captured 3D computerized tomography (CT) images of non-threat bags with a library of separately scanned (or extracted) 3D CT images of threats. Systems and methods of the present disclosure preferably combine such non-threat carrying bag images with integrated/inserted threats to provide an image of a bag with a single threat inserted/integrated therein (also referred to herein as a threat-carrying bag image) which can be used to train and/or test a detection/classification algorithm on a large number of different threats, and configurations of those threats, to achieve a significant time, cost, and risk reduction.

The systems and methods disclosed herein may create a synthetic 3D X-ray volume by inserting a 3D X-ray volume of an object into an original 3D X-ray volume of a different object. In addition, these systems and methods may be used for creating synthetic image data for training and/or testing machine learning, Artificial Intelligence (AI), or other algorithms applied to automated 3D CT object detection and/or classification.

An additional, related, application is the training of screeners to recognize threats in CT images. In this application, the same methodology applies, however; more stringent constraints on the insertion must be met, to avoid providing the screener cues that enable recognition of an artificial insertion.

Figure 1:
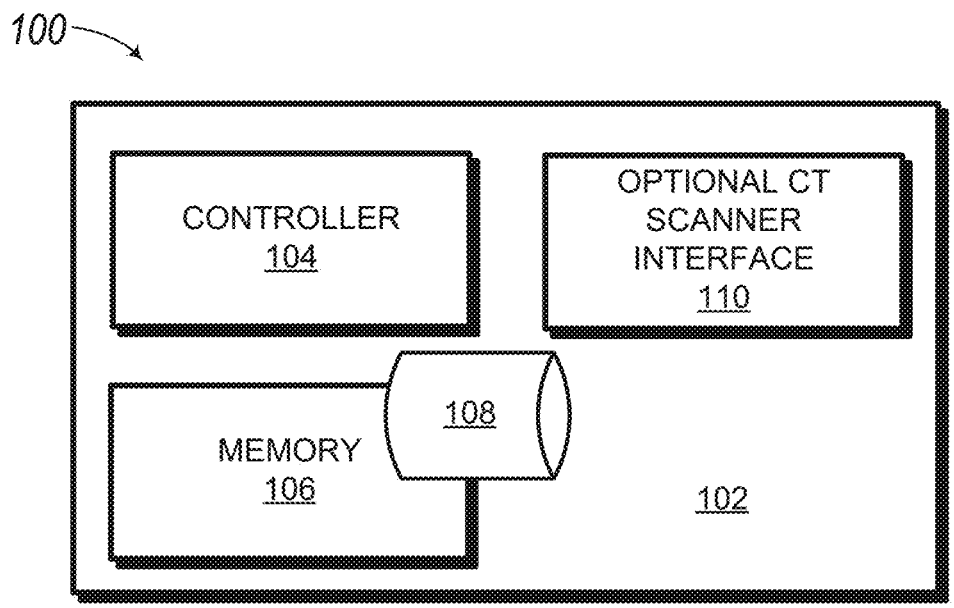
FIG. 1 depicts an example system for generation of synthetic 3D image data consistent with aspects of the present disclosure.

Turning to the Figures, FIG. 1 shows an example system 100 for generation of synthetic 3D image data consistent with aspects of the present disclosure. The system 100 includes at least one computer device 102 implemented preferably as a computer server, or more preferably, as a plurality of computers configured to communicate with each other via a network (not shown) to perform distributed tasks such as processing of 3D image data and insertion routines as variously disclosed herein. In any such cases, the computer device 102 is preferably configured to implement at least a portion of an image generation pipeline consistent with the present disclosure, such as the image generation pipeline 200 (which may also be referred to herein as a synthetic image generation pipeline) discussed further below.

As shown, the computer device 102 preferably includes a controller 104, a non-transitory memory 106, and an optional CT scanner interface 110.

The controller 104 is preferably implemented as at least one processing device/circuit such as, for example, a digital signal processor (DSP), a field-programmable gate array (FPGA), Reduced Instruction Set Computer (RISC) processor, x86 instruction set processor, microcontroller, an application-specific integrated circuit (ASIC). The controller 104 can comprise a single chip, or multiple separate chips/circuitry. As discussed further below, the controller 104 can be configured to execute processes consistent with the present disclosure using software (e.g., C or C++ executing on the controller 104), hardware (e.g., circuitry, hardcoded gate level logic or purpose-built silicon) or firmware (e.g., embedded routines executing on a microcontroller), or any combination thereof. In one preferred example, the controller 104 is configured to execute and carry out the processes of FIGS. 3-12.

The memory 106 can comprise non-transitory volatile and/or non-volatile memory devices. As shown, the memory 106 preferably includes a database 108 stored therein. The database 108 can be configured to store a plurality of bag images 208, a plurality of threat images 210, and/or various parameters associated with bags and threat images as is discussed in greater detail below. The database 108 can be implemented as a relational database, flat file, or other data storage area for storing such data which may be used when performing various processes disclosed herein.

The computer device 102 further preferably includes an optional CT scanner interface 110. The optional scanner interface 110 can be configured to communicate with 3D CT scanning equipment such as positron emission tomography (PET-CT) and/or magnetic resonance imaging (MRI) systems via a data bus (not shown). The optional CT scanner interface 110 can be configured to receive image data from the 3D CT scanning equipment for storage in the memory 106, for example.

However, it should be noted that 3D image data may also be received via a network storage location on another computer device/server, e.g., via the Internet, and not necessarily received directly from 3D CT scanning equipment. Indeed, aspects of the present disclosure contemplate receiving and storing within the memory 106 a large number of images of both bags and threat images, e.g., in the order of millions to tens of millions or more, for purposes of ensuring that generated images are highly randomized. Thus, output from the system 100 can be utilized to advantageously train both human operators of scanning equipment but also machine learning systems that utilize large amounts of feature data to, for instance, increase detection accuracy of threat objects appearing within bags/containers.

As used herein, the term "image" and "image data" may be interchangeably used to refer to data that represents a 3D image of an object (or objects) unless otherwise noted. Preferably, the 3D image data is generated from X-ray computed tomography (CT), positron emission tomography (PET-CT), and/or magnetic resonance imaging (MRI) systems. However, other types of 3D imaging sensors/systems are within the scope of this disclosure.

Preferably, such 3D image data is generated from the scanning of real-world bag and threat objects. However, this disclosure is not necessarily limited in this regard and the 3D image data of threats and/or bags may be generated synthetically, whole or in part, using artificial intelligence or other known methods.

In any such cases, image data consistent with the present disclosure preferably includes a 3D matrix of volume elements, which may also be referred to herein as voxels. The image data preferably describes the physical relationship between voxels such that the position of each voxel of a given object, or set of objects, is identifiable within three-dimensional space. Each voxel can be represented by, for instance, an integer value that denotes a density value or effective atomic number (Zeff) as detected by a CT scanner. Generally, a higher value for a voxel indicates relatively dense material, such as metal, while a lower value indicates a relatively less dense material such as fabric and air. However, this disclosure is not necessarily bound to a particular numerical representation of voxels and the provided examples are provided by way of illustration and not limitation.

As generally referred to herein, the term bag image generally refers to 3D image data representing a bag or other container, and preferably, bags/containers commonly used for air, train, or sea-travel such as luggage bags, backpacks, and boxes. Bag images consistent with the present disclosure preferably include non-threatening objects disposed within one or more associated bag subvolumes, e.g., clothes, computers, and other items commonly placed within bags during travel. More preferably, bag images consistent with the present disclosure do not include threats disposed within bag subvolumes until after threat integration, e.g., via an image generation process consistent with the present disclosure. Those bag images modified by a process consistent with the present disclosure to include integrated threats may be referred to herein as threat-carrying bag images, or threat bag images. Likewise, bags represented within such threat-carrying bag images may be referred to herein as threat-carrying bags or threat bags. On the other hand, bag images without a threat may be referred to herein as non-threat bag images, and bags represented therein may be referred to herein as non-threat bags.

The term threat image generally refers to 3D image data that represents dangerous or otherwise prohibited objects that can be found within bags/containers such as guns, knives, explosives, and other weapons. Preferably, each threat image depicts/represents a single threat object. Threat images may further include additional non-threat objects such as a bag which contains the threat and adjacent objects.

Figure 2:
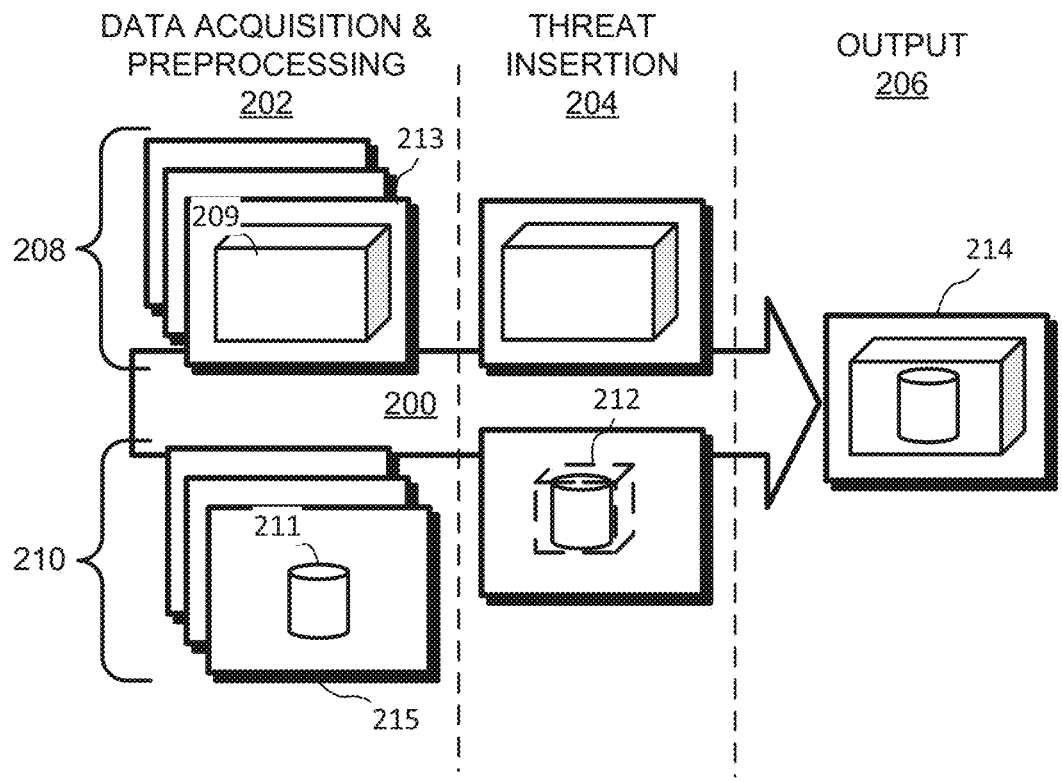
FIG. 2 shows an example image generation pipeline having a plurality of stages suitable for implementation by the system of FIG. 1, in accordance with aspects of the present disclosure.

FIG. 2 shows an example image generation pipeline 200, which may also be referred to herein as a synthetic image generation pipeline, consistent with aspects of the present disclosure.

As shown, the image generation pipeline 200 preferably includes a plurality of stages including a data acquisition and preprocessing stage 202, a threat integration stage 204 (which may also be referred to herein as a threat insertion stage), and an output stage 206.

A system configured consistent with the present disclosure, e.g., system 100 of FIG. 1, can implement all, or a portion, of the image generation pipeline 200. For instance, data acquisition including the capture of 3D image data can occur on a separate computer system and be stored in a network-accessible location or otherwise be available to the computer device 102 for purposes of creating synthetic image data consistent with the present disclosure.

Likewise, a system configured with the present disclosure can implement additional stages such as image post-processing stages following output via the output stage 206. Thus, the particular configuration of the example image generation pipeline 200 shown in FIG. 2 is not intended to be limiting and systems and methods consistent with the present disclosure can implement more or fewer processing stages depending on a desired configuration.

The example image generation pipeline 200 preferably begins with the data acquisition and preprocessing stage 202. In this preferred example, the data acquisition and preprocessing stage 202 includes storing a plurality of bag images 208 and a plurality of threat images 210 being received and stored within the memory 106. The plurality of bag images 208 and the plurality of threat images 210 are preferably preprocessed for filtering purposes and/or to calculate parameters such as available bag subvolumes, threat volumes, and threat material type, as is discussed further below.

Continuing the above example, the threat integration stage 204 preferably includes the controller 104 selecting a target bag image 213 from the plurality of bag images 208 and a corresponding threat image 215 from the plurality of threat images 210 that includes a threat 211 which can "fit" within one or more bag subvolumes of the represented bag 209, e.g., based on bag and threat parameters determined/calculated during the data acquisition and preprocessing stage 202. Alternatively, the controller 104 first selects the target threat image 215 from the plurality of threat images 210 and the corresponding target bag image 213 from the plurality of bag images 208 in which the selected target threat 211 can "fit." More preferably, the controller 104 randomly selects bags and/or target threat images during the threat insertion stage 204.

In any such cases, the controller 104 then can extract image data for the target threat 211 from that of the surrounding area within the selected threat image 215. The controller 104 can then determine a target subvolume for the bag 209 represented within the target bag image 213 that "fits" the target threat 211, with this subvolume also being referred to herein as an insertable subvolume. Note, bag subvolumes may also be referred to herein as connected component labeling (CCL) subvolumes. The controller 104 then preferably randomly selects an orientation for the target threat 211 within the insertable subvolume, and more preferably, randomly selects an orientation for the target threat 211 within the insertable subvolume of the bag 209.

Note, if threat objects are not isolated within threat images, the controller 104 can segment all threat objects so that they are isolated volumes, with each isolated volume having a determined bounding box, such as bounding box 212. This scenario can occur if threats are extracted from bags with other items.

Further note, the steps for processing either non-threat or threat bags can be accomplished on their own and prior to insertion. If done prior to insertion, for example, every bag that can have an inserted threat will preferably have one or more CCL subvolumes, with each CLL subvolume being associated with a list of insertable threats, as is discussed in further detail below.

Insertion can proceed for a given bag with a threat selected from the total insertable threats for that bag, and for the one or more CCL subvolumes that it can be inserted into. Done this way, insertion can preferably be performed randomly by threat or bag by simply performing lookups via tables, e.g., stored within database 108, to determine which bags can be used to insert a given threat, or vice versa, and selecting from the available choices potentially at random, and without repetition.

The image generation pipeline 200 then preferably ends with the output stage 206, and in in the preferred example of FIG. 2, with the controller 104 generating a threat-carrying image 214 based on the target bag image 213, insertable subvolume of the target bag image 213, target threat image 215 and a selected orientation of the represented threat 211 within the insertable subvolume. Preferably, the controller 104 generates the threat-carrying image 214 as 3D image data, although this disclosure is not necessarily limited in this regard. For example, the controller 104 may alternatively, or in addition, output two-dimensional (2D) images depending on a desired configuration. Processes consistent with the present disclosure can be performed by controller 104 relatively quickly and potentially in real time, e.g., based on the various mappings and preprocessing of bags and threats.

In operation and execution of the image generation pipeline 200, the controller 104 first preferably analyzes each threat of a plurality of threats to determine threat parameters during the data acquisition and preprocessing stage 202. Note, additional exemplary processes for implementing the various stages of the example image generation pipeline 200 are discussed further below with regard to the processes of FIGS. 3-12.

Continuing on, the controller 104 preferably first retrieves the plurality of threat images 210 from the memory 106 and analyzes each to determine corresponding threat parameters. The determined threat parameters preferably include a threat volume/bounding box (e.g., see bounding box 212 of FIG. 2) and/or threat material type.

Next, the controller 104 then stores the plurality of threats in a memory, and preferably the memory 106, based on the determined threat parameters. More preferably, the controller 104 stores each of the plurality of threats as a row in the database 108 of memory 106 in a descending order/rank based on predetermined order. One preferred predetermined order is ascending order such that the threat images are stored in the database 108 from smallest to largest.

The controller 104 then identifies bags with one or more insertable subvolumes based on the plurality of threats and associated parameters stored in the memory 106. Preferably, the controller 104 identifies bags with one or more insertable volumes by first selecting the threat with the smallest determined volume, e.g., by selecting the first/top row from the threat table stored in the database 108. For each bag image of the plurality of bag images, the controller 104 then preferably identifies if one or more bag subvolumes is greater than the volume of the smallest threat, with those qualifying subvolumes being generally referred to herein as insertable subvolumes or insertable CCL subvolumes.

The controller 104 may then store a value in the memory 106 that identifies a given bag as having an insertable subvolume. For example, and in the context of database 108, the controller 104 may store for each bag image a row that includes a column labeled "HasInsertableVolume", which gets set to TRUE upon determination/identification of at least one insertable volume. Optionally, the controller 104 may delete one or more bag images of the plurality of bag images if no insertable volumes are detected.

The controller 104 then preferably stores the bags identified as having at least one insertable volume and associated parameters in a memory, and preferably, the memory 106. The associated parameters may also be referred to herein as bag parameters. Such bag parameters can include, for instance, the overall number of subvolumes within the bag, and dimensions for each subvolume (e.g., based on CCL labeling as discussed further below).

Additionally, bag parameters can also include other values such as a ratio value which represents an estimated overall bag capacity relative to insertable volume dimensions. The ratio value, which may also be referred to herein as a noise ratio, can be useful for rating bags that have a relatively large number of non-threatening items (i.e., noise), and thus by extension, a proportionally constrained area which is available for insertion of threats. For example, consider a bag with an overall volume of 1 liter and a single insertable volume of 0.2 liters. The ratio of such a bag is then 1:0.2, which indicates a relatively small amount of insertable space for threats. Bags with noise ratios in the range of 1:0.5 to 1:0.1, for example, may be particularly useful for generating bag images with inserted threats consistent with the present disclosure given that the bag includes a large number of non-threatening elements which could obscure/hide the presence of a threat object. Likewise, bags with noise ratios in the range of 1:0.55 to 1:1.0 may be considered relatively open bags and can be useful for generating bag images which are considered relatively easy or trivial to detect the presence of threats therein. In any such cases, a system consistent with the present disclosure may utilize the noise ratio value for purposes of generating bag images with a target degree of complexity in order to aid in the training of human and/or artificial intelligence processes.

Next, the controller 104 then preferably maps each of the bags with at least one insertable volume with insertable threats. Preferably this includes, for each bag with one or more insertable volumes, determining which threats within the plurality of threat images can be inserted into each bag subvolume, e.g., based on a threat have a volume which is less than a given big subvolume. The controller 104 then maps each of the bags with one or more of the threat images which include insertable threats. In one example, the controller 104 creates rows in a mapping table within the database 108, with each row preferably including an identifier of a threat image of the plurality of threat images 210 and an associated identifier of a bag of the plurality of bag images 208, and more preferably, an identifier of an insertable subvolume within the bag.

The controller 104 then executes the output stage 206 and generates a threat-carrying image 214 by inserting a target/selected threat into an insertable volume of a bag. Preferably, the selection of the target threat and corresponding bag is based on a mapping/lookup table within the memory 106 as discussed above. The threat-carrying image 214 is preferably a three-dimensional image capable of presentation on a computer display, and more preferably, a display typically utilized by a 3D CT scanning device.

Figure 3:
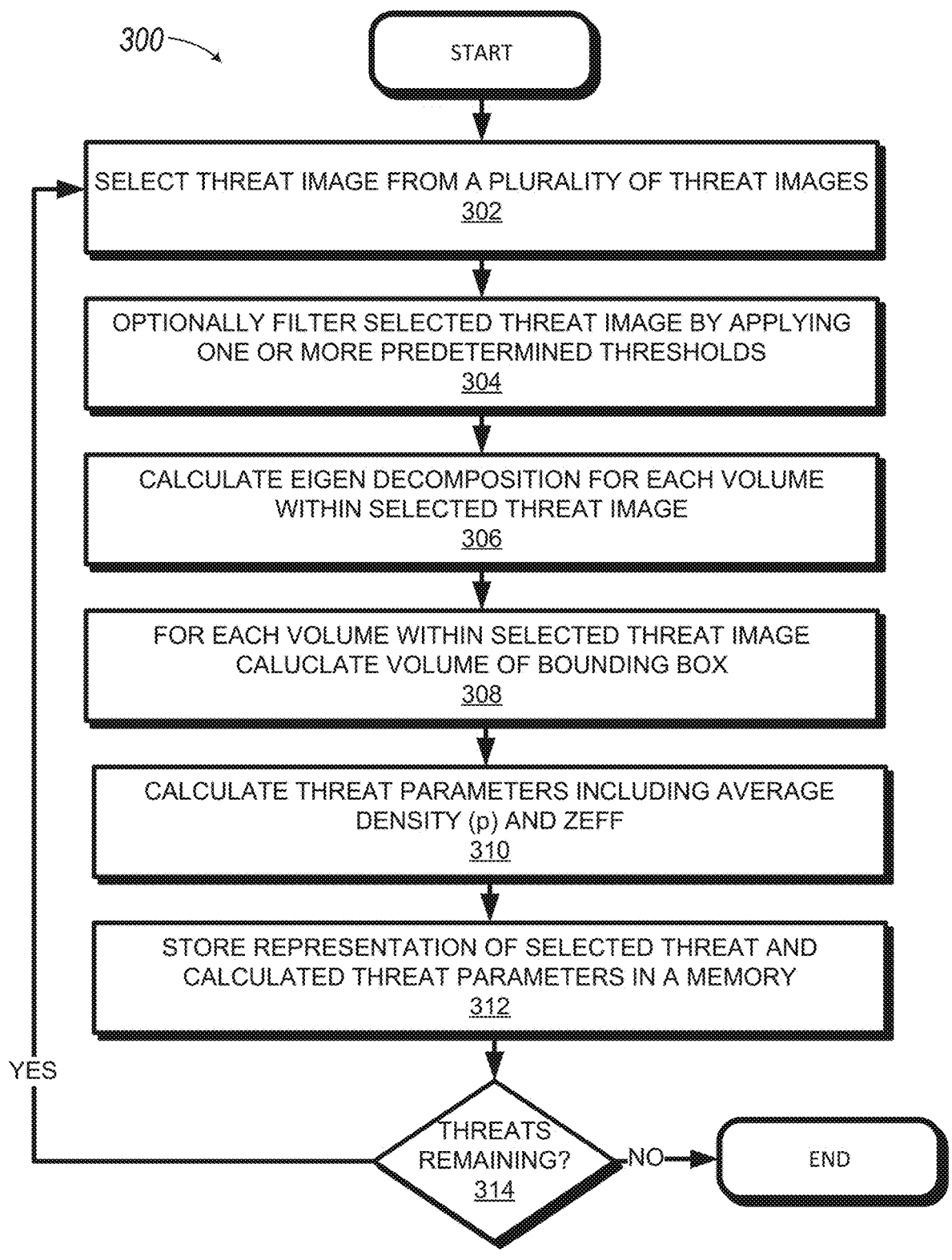
FIG. 3 shows one example process for implementing one or more stages of the example image generation pipeline of FIG. 2, in accordance with aspects of the present disclosure.

FIG. 3 shows an example process 300 which can be used to implement one or more stages of an image generation pipeline consistent with the present disclosure. Preferably, the example process 300 is performed by the controller 104.

In operation 302, the controller 104 selects a threat image from a plurality of threat images, and preferably, from the plurality of threat images 210 (see FIG. 2) stored in a memory.

In operation 304, the controller 104 optionally filters the selected threat image by applying one or more predetermined thresholds. In one preferred example, this can include the controller 104 comparing the density (p) and/or Zeff for each voxel within the selected threat image to a predetermined threshold such that voxels representing clothes and air, for instance, get removed.

FIG. 15 shows one example of a plurality of explosive threats and associated bounding boxes, namely (a) brick shaped, (b) spherical and (c) cylindrical (e.g., a pipe). As shown, the example explosive threats (a)-(c) of FIG. 15 are of different sizes and shapes, and may also contain material from other (e.g., non-threatening) objects within the same (and potentially covering/obscuring the threat). FIG. 16 shows the example explosive threats (a)-(c) of FIG. 15 after applying filtering/thresholding in operation 304.

In operation 306, the controller 104 calculates an Eigen decomposition for each volume within the selected threat image. Preferably, the Eigen decomposition includes a mathematical representation of three (3) orthogonal axes that define the threat object including the major, minor, and intermediate axis.

One example of Eigen decomposition is as follows which utilizes thresholded threat voxels and assumes that the densities of all pixels within an object are equivalent (although the densities could be considered and is within the scope of this disclosure, the assumption is that variations are due to imperfect correction for physical effects).

First, Calculate the center of mass, which can be reduced as Equation (1):

$$\overrightarrow{COM} = \frac{1}{n}\sum_{i=1}^{n}\overrightarrow{x_i},\qquad\text{Equation (1)}$$

where $\overrightarrow{x_i}$ are the point locations of each voxel.

Second, Make the $\overrightarrow{COM}$ the center of coordinates using Equation (2):

$$\overrightarrow{x_i'} = \overrightarrow{x_i} - \overrightarrow{COM}\qquad\text{Equation (2)}$$

Third, calculate the covariance matrix of the threat voxels using Equation (3):

$$COV = \begin{pmatrix} cov(x,x) & cov(x,y) & cov(x,z) \\ cov(y,x) & cov(y,y) & cov(y,z) \\ cov(z,x) & cov(z,y) & cov(z,z) \end{pmatrix}\qquad\text{Equation (3)}$$

where $cov(p,q) = \sum_{i=1}^{n}\frac{(p_i - \overline{p})(q_i - \overline{q})}{n-1}$ Fourth, calculate the eigenvalues and eigenvectors of the covariance matrix using Equation (4):

$$COV\vec{e} = \lambda\vec{e} \text{ or } COV - \lambda I\vec{e} = 0,\qquad\text{Equation (4)}$$

where I is the 3×3 identity matrix.

Figure 17:
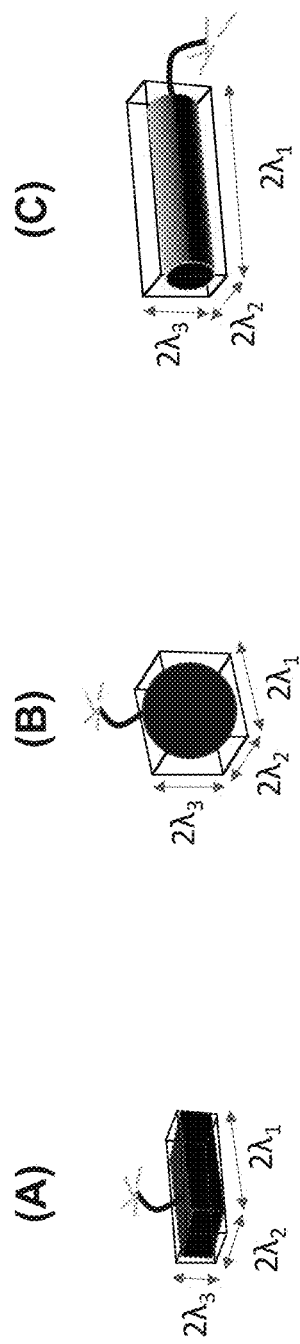
FIG. 17 shows various example threats and eigenboxes/bounding boxes for use by systems and methods consistent with the present disclosure.

FIG. 17 illustrates some example Eigen decomposition values determined during operation 306. As shown, explosive threats (A), (B), (C) of different sizes and shapes within eigenboxes/bounding boxes are defined by the three eigenvalues of the covariance matrix of the threat voxels and with the three orthogonal axes defined by the corresponding eigenvectors. As further shown, the magnitude of the dimension in each axis direction is twice the eigenvalue, with the largest eigenvalue defining the major axis ($2\lambda_1$), the smallest defining the smallest axis ($2\lambda_2$), and the intermediate eigenvalue defining the intermediate axis ($2\lambda_3$). Note, in some cases such as a sphere and a cylinder, one or more eigenvalues may be equal.

Figure 20:
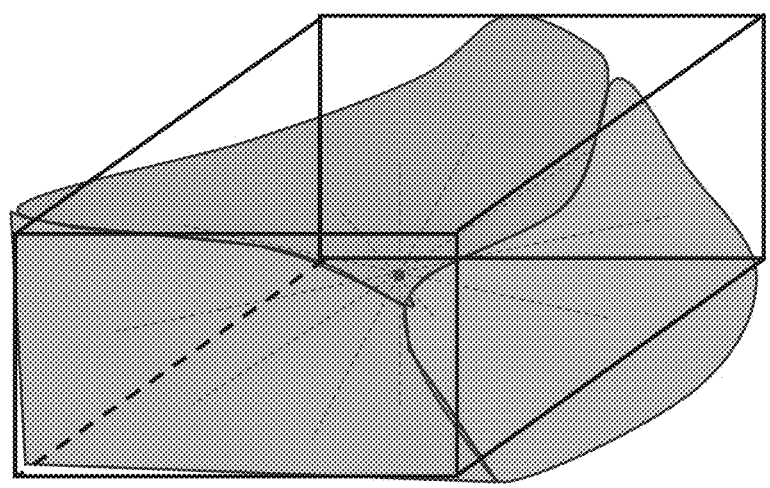
FIG. 20 shows one example eigenbox/bounding box suitable for use by systems and methods consistent with the present disclosure.

Further note, this disclosure is not necessarily limited to utilizing eigenvalues for determining an objects profile/volume. For example, and as shown in FIG. 20, the eigenbox approximates three principal axes of an object's point distribution. Alternatives to eigendirections and their associated eigenboxes can include lines radiating from the center of mass (COM is generally shown as the center dot within the eigenbox of FIG. 20) of an object (threat or void and/or low-density material) at a regular or irregular interval of solid angle to the boundary of the object, thereby characterizing the 3D object geometry and dimensions. Other alternatives include spherical harmonic or tensor decomposition, or other approaches of characterizing the 3D object geometry and dimensions.

In operation 308, the controller 104 calculates the volume of each bounding box for each volume within the selected threat image. One such example bounding box 212 is shown in FIG. 2.

In operation 310, the controller 104 calculates the average density, avg p, and Zeff of the threat within the selected threat image.

In operation 312, the controller 104 stores a representation of the selected threat and calculated threat parameters, e.g., the Eigen decomposition, bounding box (e.g., the dimensions of the volume which the threat occupies), avg p, and Zeff, in a memory, e.g., the memory 106.

In operation 314, the controller 104 determines if any threat images remain for processing, and if so, the process 300 returns to operation 302 and selects the next threat image. On the other hand, and if no threat images remain, the process 300 then ends.

Preferably, the controller 104 iterates over each threat image of the plurality of threat images 210 stored in the memory 106 in sequence. In addition, the controller 104 further preferably stores the threat images analyzed via process 300 and determined threat parameters in an ascending order in the memory 106 based on threat volume such that threats are stored in the memory (and more preferably within the database 108) from smallest to largest.

Figure 4A:
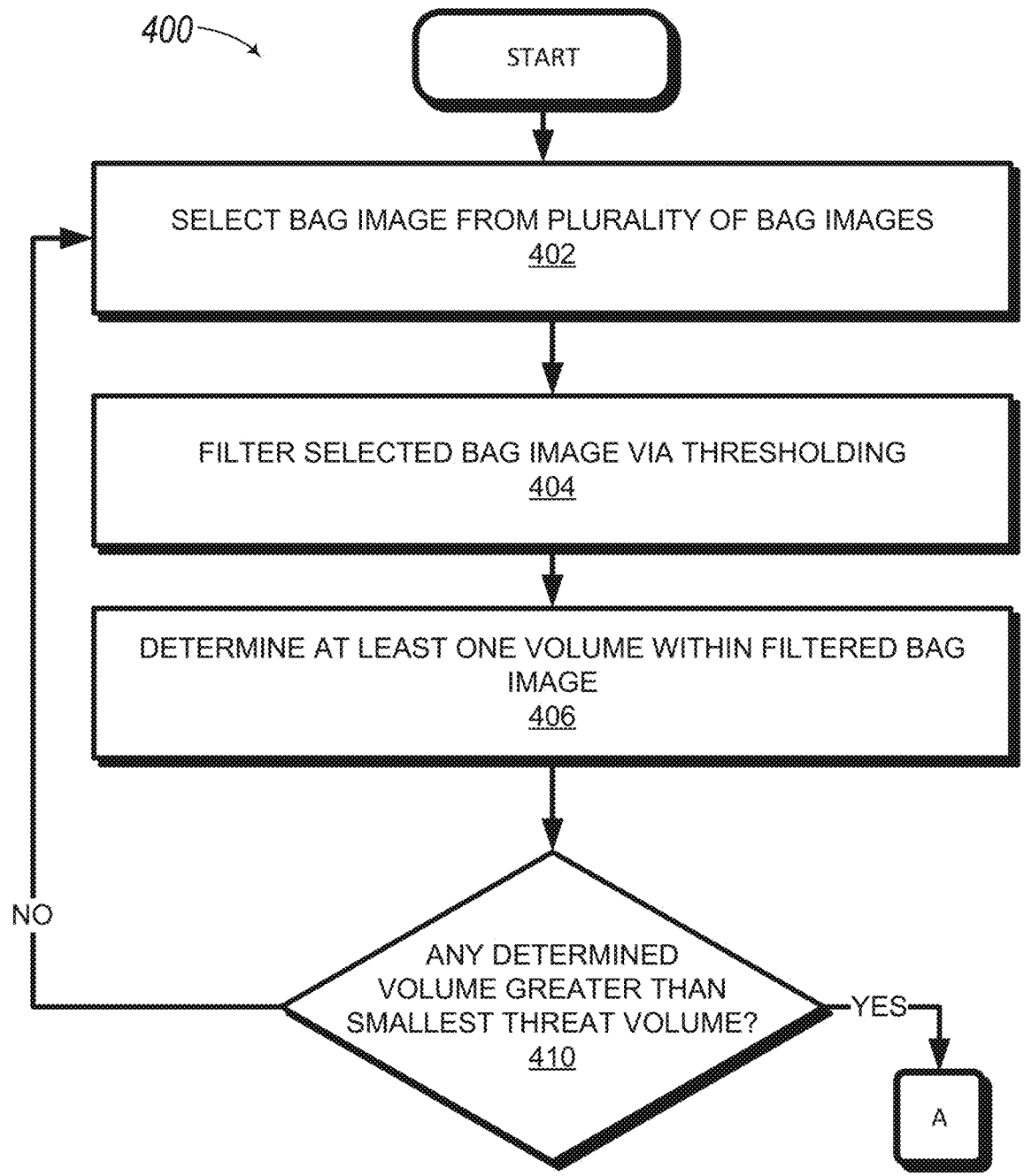
FIGS. 4A-4B show another example process for implementing one or more stages of the example image generation pipeline of FIG. 2, in accordance with aspects of the present disclosure.
Figure 4B:
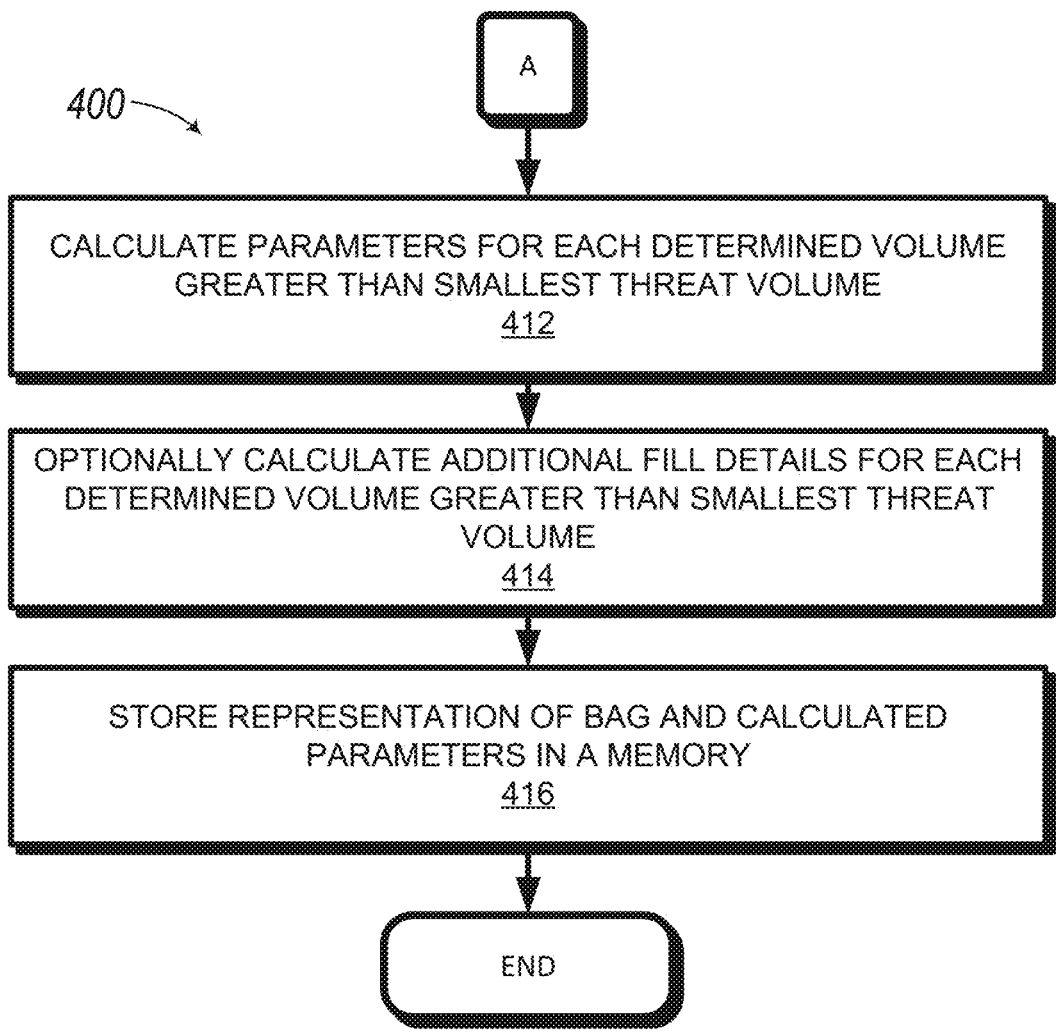

FIGS. 4A-4B show another example process 400 which can be performed by the controller 104, for example, to implement one or more stages of an image generation pipeline consistent with the present disclosure.

In operation 402, the controller 104 selects a bag image from a plurality of bag images, e.g., from the plurality of bag images 208 (FIG. 2).

In operation 404, the controller 104 filters the selected bag image via thresholding. Preferably, this includes thresholding the voxels of the selected bag image using a metric, e.g., density ρ and/or Zeff, such that those voxels having a corresponding value below a predetermined threshold, e.g., those voxels corresponding to clothes and/or air, are removed/ignored.

In operation 406, the controller 104 determines at least one volume within the selected bag image filtered during operation 404. Preferably, this includes the controller 104 using a connected component labeling (CCL) scheme to identify those voxels that represent an area within the bag having a predetermined minimum volume of at least 0.5 liters, for example. The subvolumes determined in operation 406 may therefore also be referred to herein as CCL subvolumes.

Figure 13:
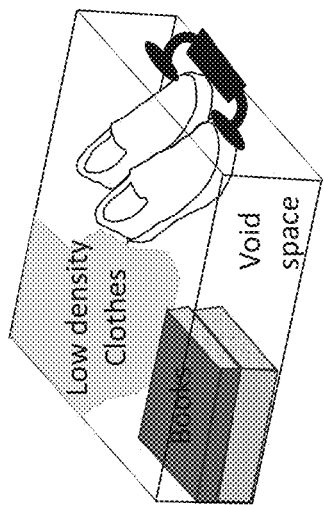
FIG. 13 illustrates one example process for applying connected component labeling to a target bag/container with loose/sparsely-packed objects to determine one or more insertable volumes consistent with the present disclosure.
Figure 13:
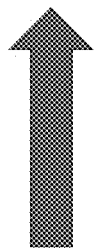
Figure 13:
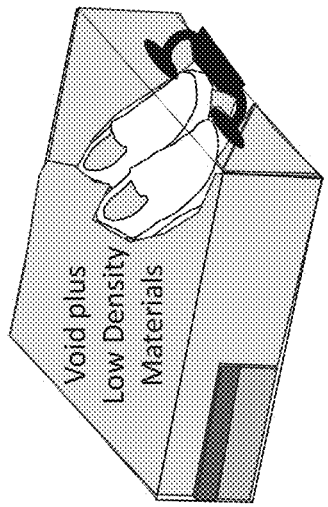
Figure 14:
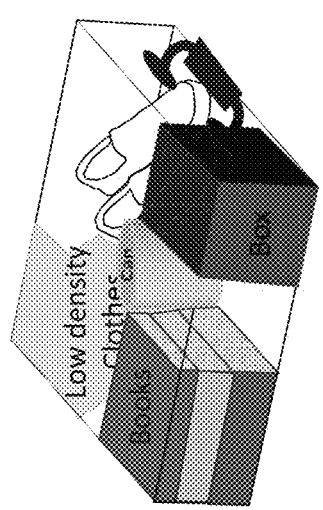
FIG. 14 illustrates one example process for applying connected component labeling to a target bag/container with densely-packed objects to determine one or more insertable volumes consistent with the present disclosure.
Figure 14:
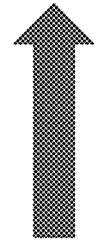
Figure 14:
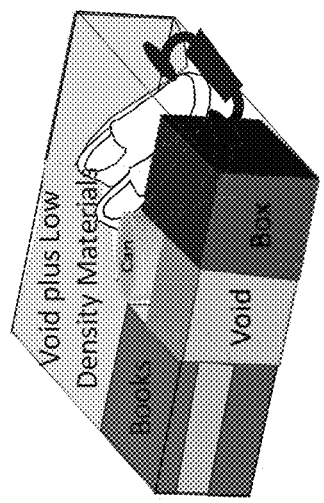

One example of using CCL in this manner to identify CCL subvolumes in relatively low-density bags/containers versus high-density bags/containers is shown in FIGS. 13 and 14. As shown in FIG. 13, connected component labeled volume(s) within a sparsely packed bag/container with primarily low-density materials tend to have relatively large and continuous threat insertion volumes, also referred to herein as insertable CCL subvolumes. In contrast, and as shown in FIG. 14, bags/containers with high density materials tend to have relatively discontinuous and smaller overall volumes capable of threat insertion.

Return to FIG. 4A, and in operation 410, the controller 104 determines if any of the areas determined in operation 406 have a volume which is greater than a smallest threat, e.g., the smallest threat object determined in operations 302 and 304 of process 300 (See FIG. 3). If any areas of the selected bag image are determined to have a volume greater than the smallest threat, the process 400 continues to operation 412 (FIG. 4B), otherwise, the process 400 returns to operation 402 and selects the next bag image from the plurality of bag images, if available.

Figure 18:
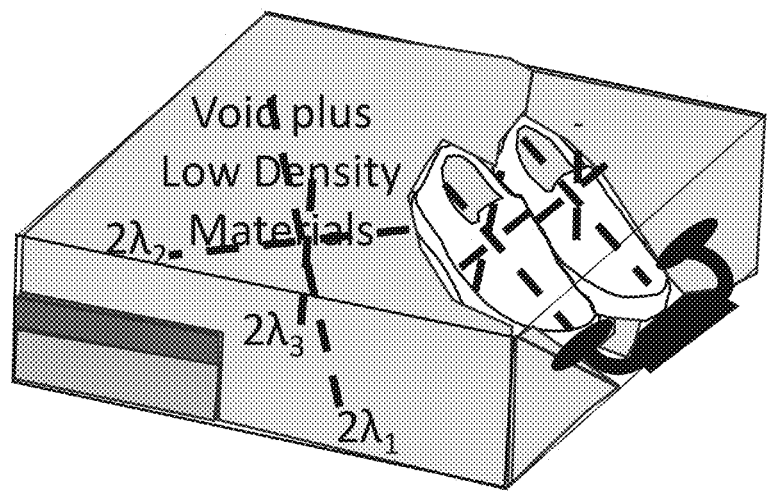
FIG. 18 shows a bag with loose/sparsely packed objects and corresponding eigenvalues for subvolumes in accordance with aspects of the present disclosure.
Figure 19:
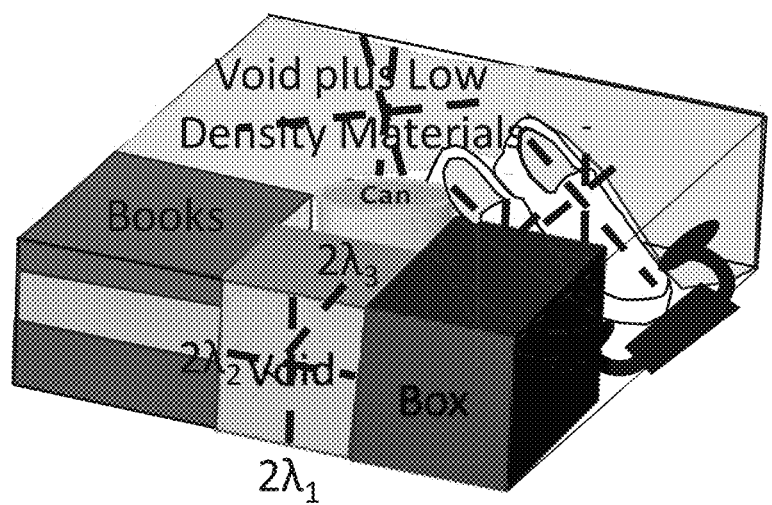
FIG. 19 shows a bag with densely packed objects and corresponding eigenvalues for subvolumes in accordance with aspects of the present disclosure.

Note, and as is shown in FIG. 18, eigendirections and their associated eigenboxes/bounding boxes can be approximations to complex volume shapes. For connected component labeled voids and low-density volume(s) from a sparsely packed bag or package, and/or a bag or package with primarily low-density materials, such volumes are likely large and continuous. In contrast, and as shown in the example of FIG. 19, connected component labeled voids and low-density volume(s) from a densely packed bag or package, and/or a bag or package with substantial high-density materials, tend to have insertable volumes that are relatively smaller and discontinuous.

In operation 412, the controller 104 calculates parameters for each subvolume determined in operation 410 to have a volume that is larger than the smallest threat.

In operation 414, the controller 104 optionally calculates additional fill details for each subvolume determined in operation 410.

In operation 416, the controller stores a representation of each bag and calculated parameters from operation 412 in a memory, and preferably, in the memory 106 (See FIG. 1).

Figure 5:
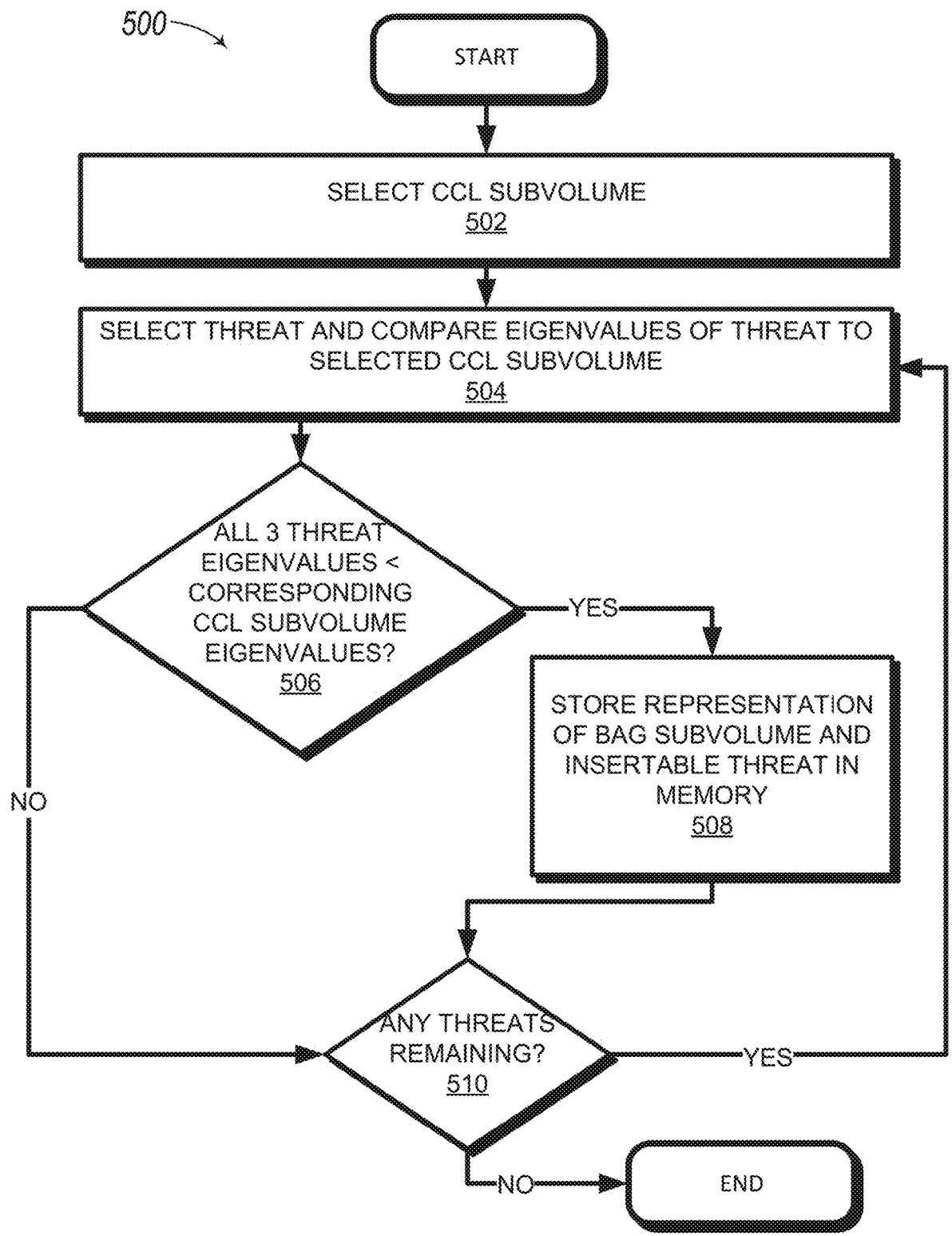
FIG. 5 shows another example process for implementing one or more stages of the example image generation pipeline of FIG. 2, in accordance with aspects of the present disclosure.
Figure 6A:
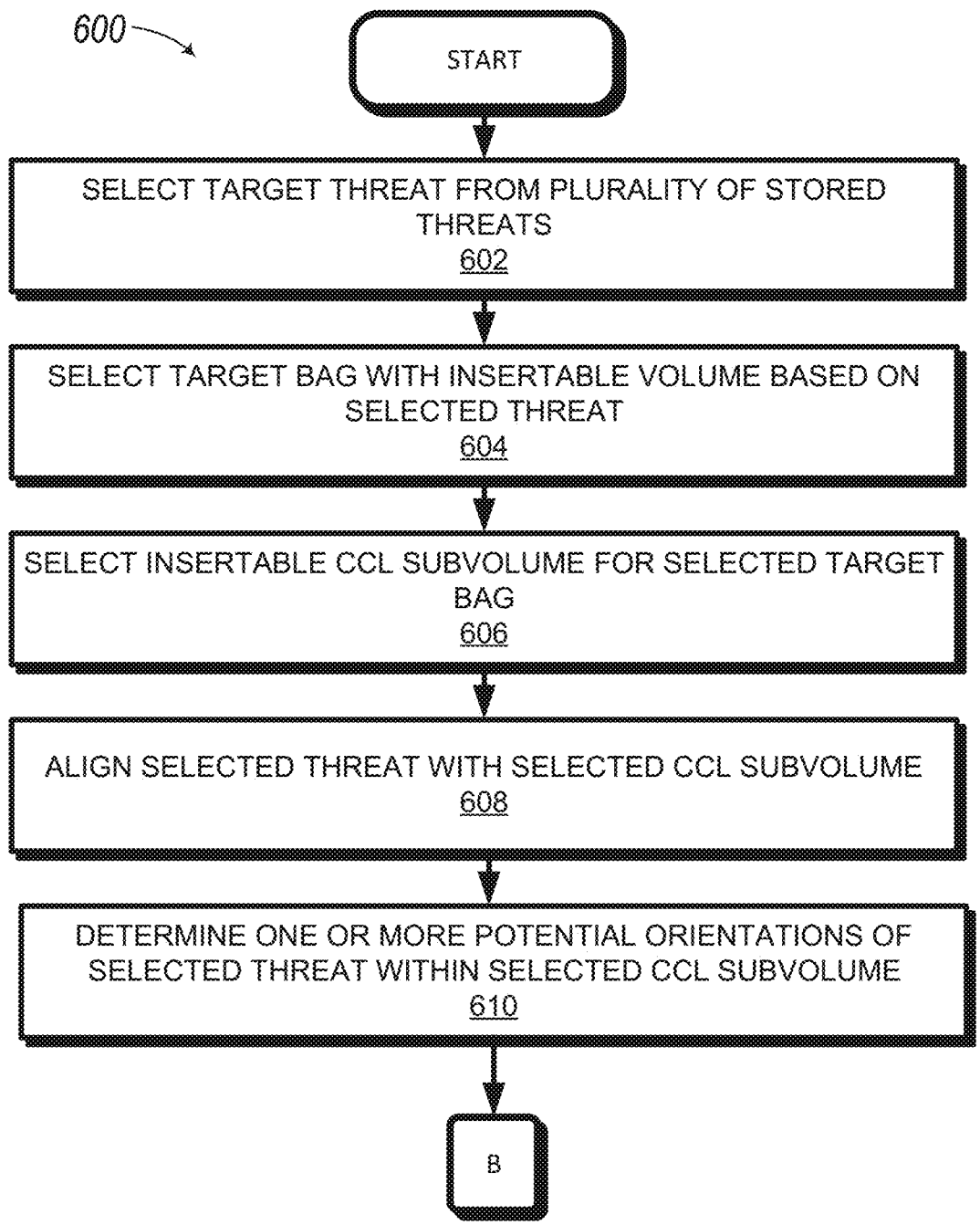
Figure 6B:
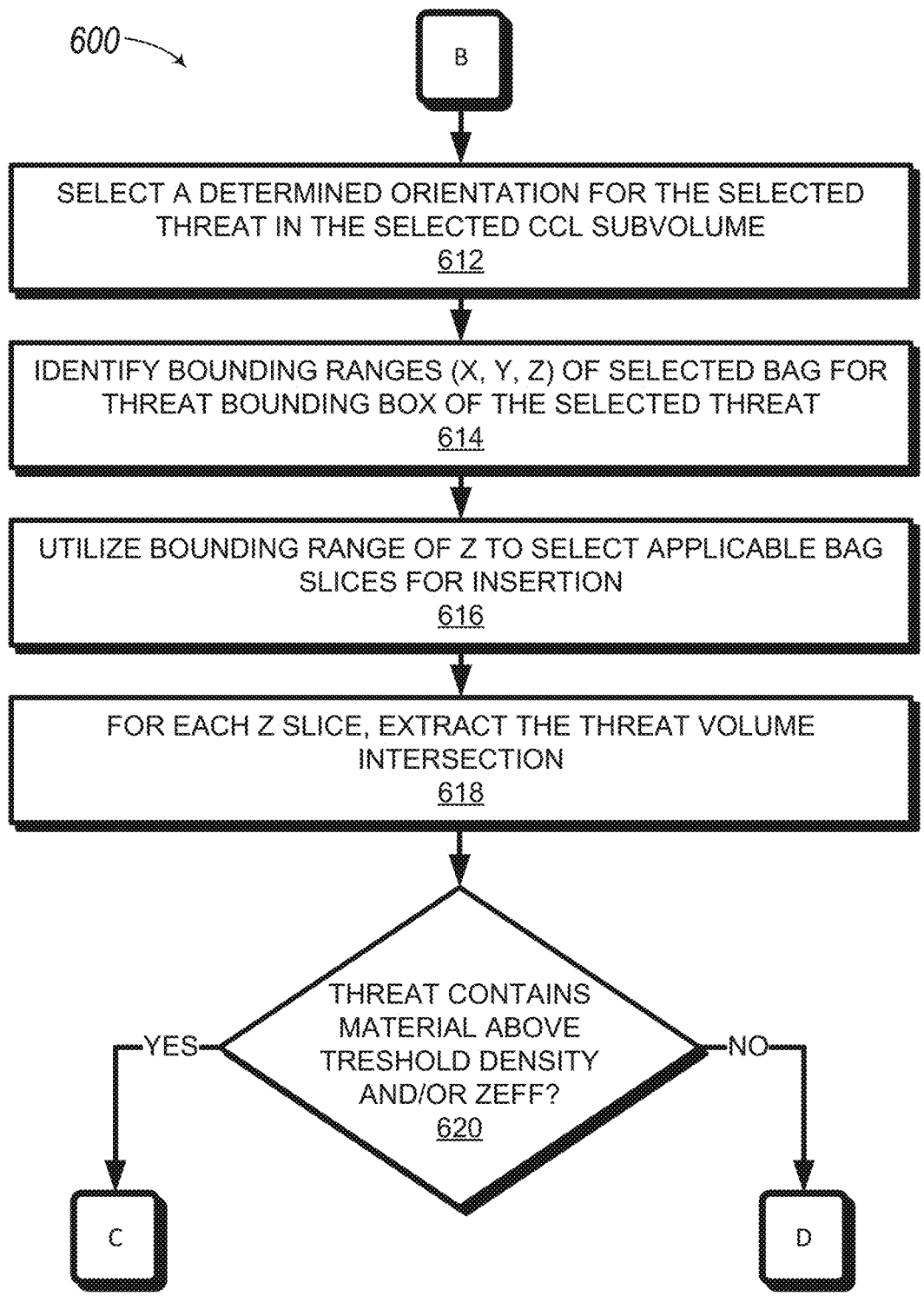
Figure 6D:
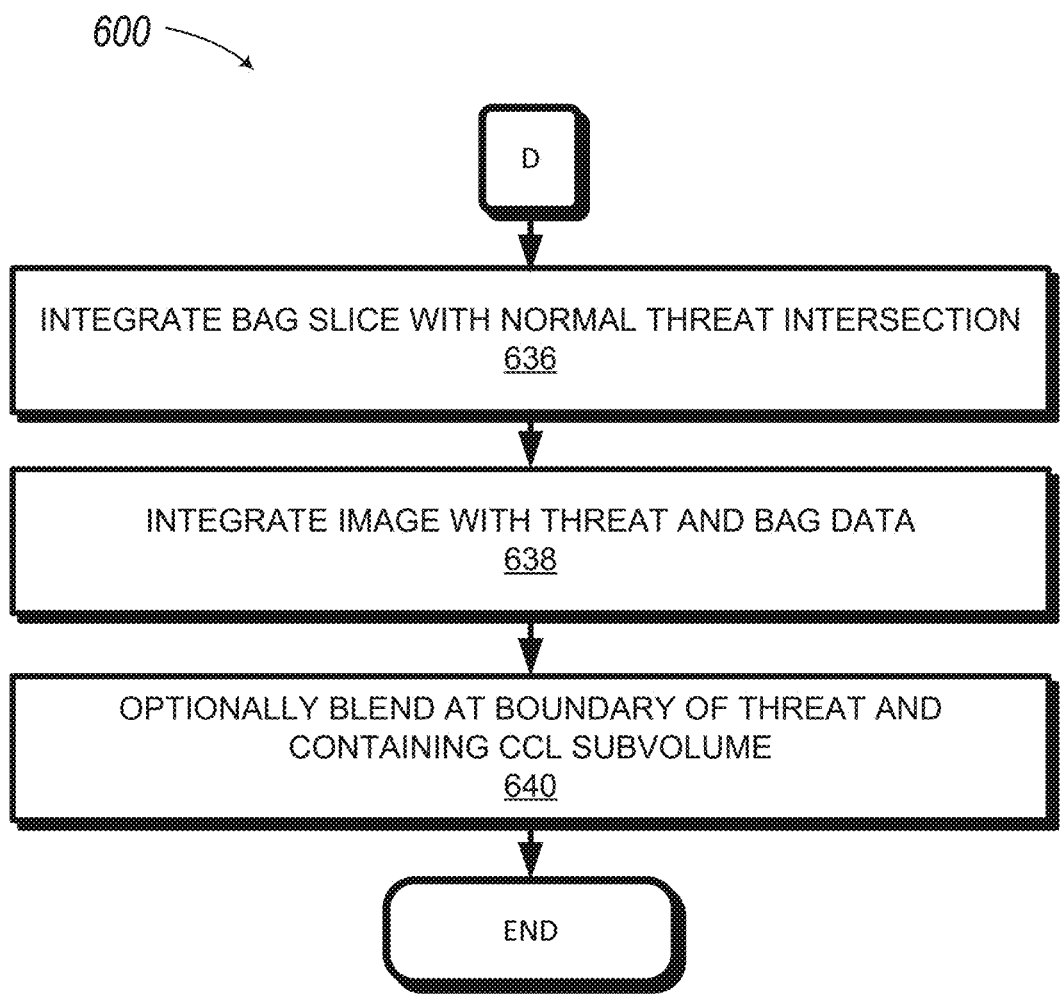

FIG. 5 shows an example process 500 which can be used to implement one or more stages of an image generation pipeline consistent with the present disclosure. Preferably, the controller 104 performs process 500 for purposes of mapping bag subvolumes with threat objects which are insertable therein to decrease the overall amount of time when performing an insertion process consistent with the present disclosure.

In operation 502, the controller 104 selects a CCL subvolume. In operation 504, the controller 104 selects a threat image and compares the Eigen decomposition values of the threat to the selected CCL subvolume.

In operation 506, the controller 104 determines if all three Eigen decomposition values (e.g., major, minor, and intermediate axis) of the selected threat is less than the corresponding Eigen decomposition values of the selected CCL subvolume. If so, the process 500 continues to operation 508, and if not, the process continues to at 510.

Figure 21:
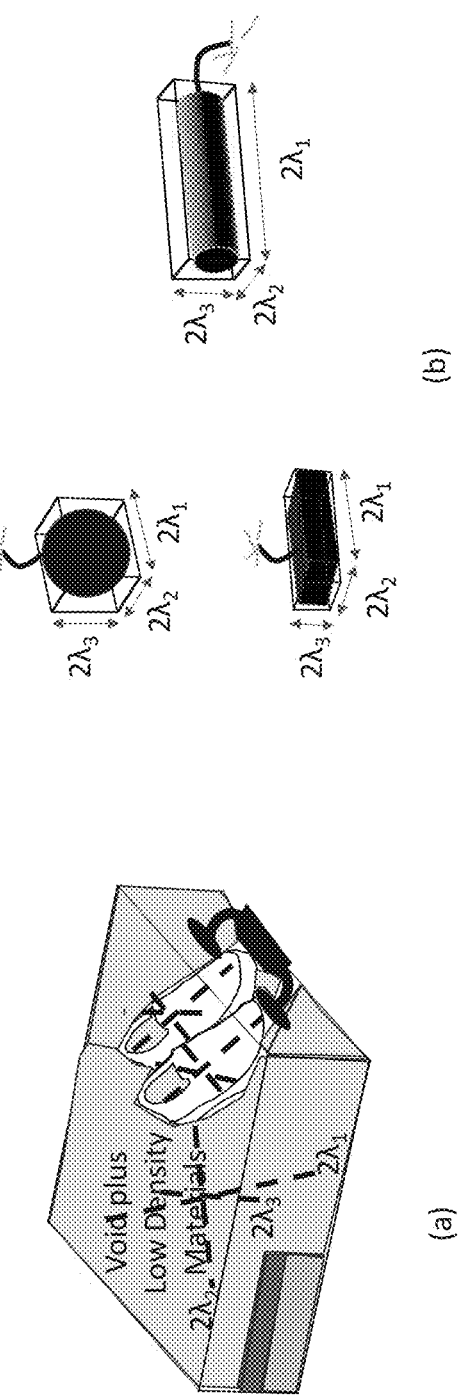
FIG. 21 illustrates one example approach to identifying bag subvolumes in a loose/sparsely packed bag/container that can "fit" one or more threat objects consistent with aspects of the present disclosure.

For example, and as shown in FIG. 21, the determined principal axis of each connected void and low-density volume within a sparsely packed bag or package (a) can be combined with the defined principal axes of any given threat (b) to determine if the threat will be insertable within the given volume. This example illustrates a large void volume that "fits" potentially all threats because each of the respective principal axes of the threats is smaller than the respective principal axes of the void volume.

Figure 22:
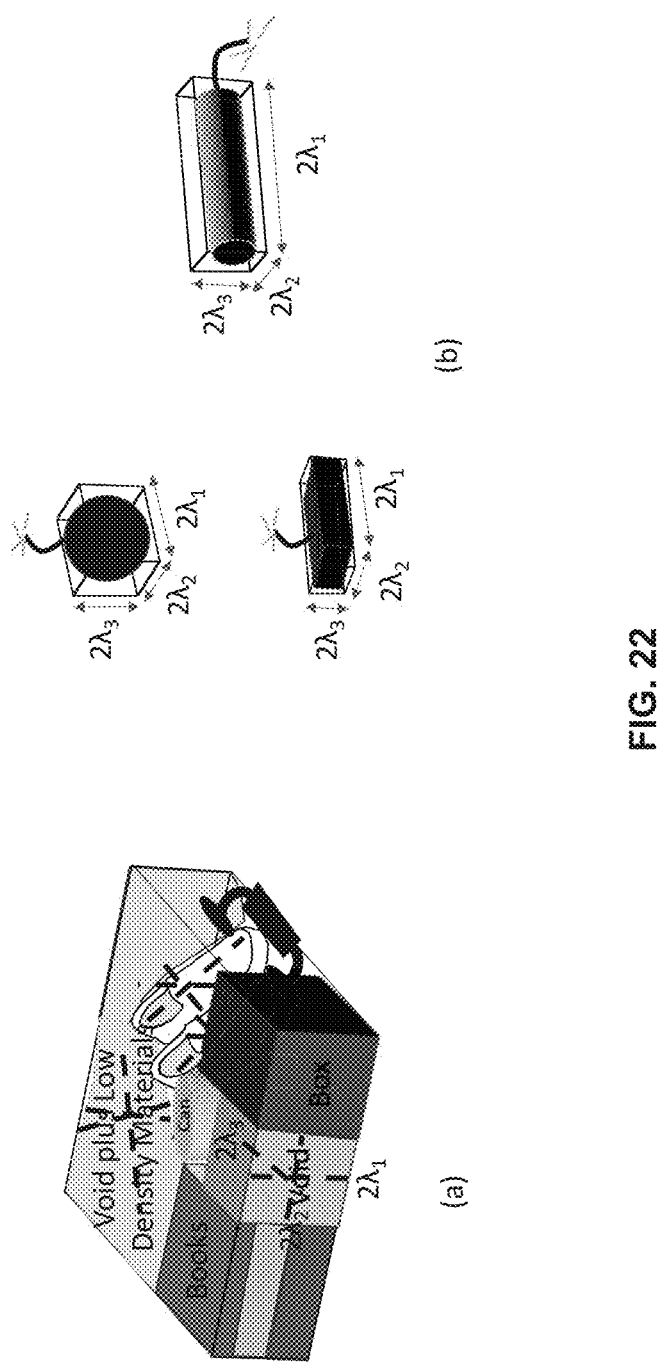
FIG. 22 illustrates one example approach to identifying bag subvolumes in a densely packed bag/container that can "fit" one or more threat objects consistent with aspects of the present disclosure.

In contrast, and as shown in FIG. 22, the determined principal axis of each connected void and low-density volume within a densely packed bag or package (a) can be combined with the defined principal axes of any given threat (b) to determine if the threat will be insertable within the given volume. This example illustrates a small void volume that fits only the spherical threat because at least one of the respective principal axes of the other threats is larger than any of the respective principal axes of the void volume.

Continuing with FIG. 5, and in operation 508, the controller 104 stores a representation of the bag subvolume and insertable threat in a memory. As discussed above, this preferably includes the controller 104 storing a row/entry in a lookup table in the database 108 that associates threats with insertable bags and bag subvolumes.

Figure 23:
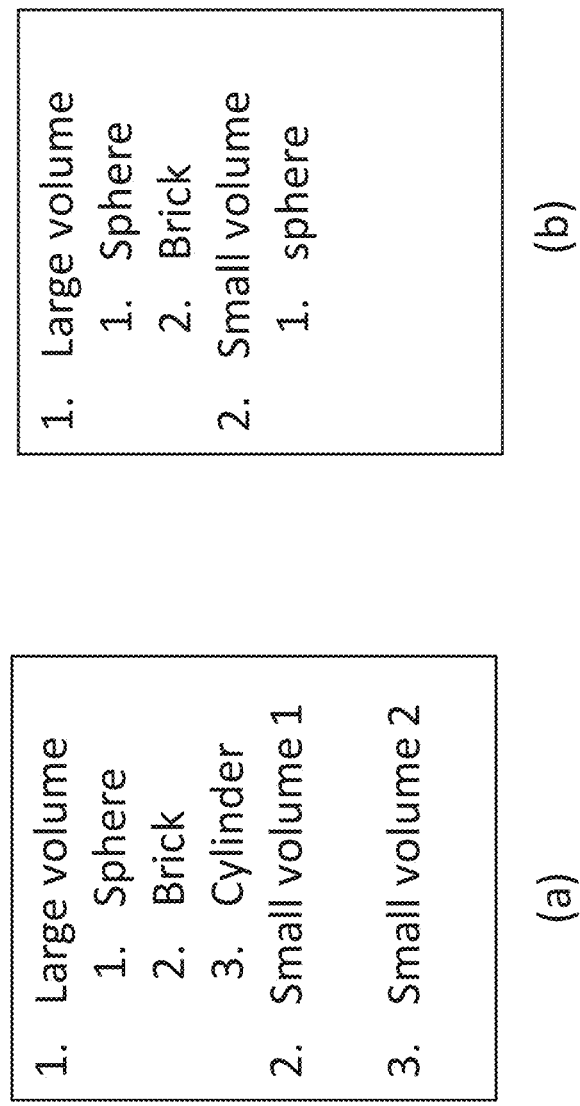
FIG. 23 illustrates various example bag-threat mappings consistent with aspects of the present disclosure.

For instance, and with reference to the examples of FIGS. 21 and 22 discussed above, the list of potential threats fitting into each void volume of a sparsely packed (a) and densely packed (b) bag can be mapped as is discussed above for storage in a lookup table. Some such example lookup table entries are provided in FIG. 23 and discussed further below. In operation, each bag/package may be assigned an identifier, e.g., a number, and each threat volume may also be assigned an identifier, e.g., a number.

In operation 510, the controller 104 determines if any threats remain for processing, and if so, the process 500 returns to operation 504 and selects the next threat image for processing. On the other hand, if no threat images remain for processing, the process 500 then ends.

FIG. 6A-6D collectively show an example process 600 which can be used to implement one or more stages of an image generation pipeline consistent with the present disclosure.

In operation 602, the controller 104 selects a threat from a plurality of stored threats, e.g., based on the plurality of threat images 210 (See FIG. 2) stored in a memory. Preferably, the controller 104 randomly selects a target threat in operation 602.

In operation 604, the controller 104 selects a target bag with an insertable volume based on the threat selected in operation 602. Preferably, the controller 104 randomly selects the target bag in operation 604 based on a lookup table in the memory 106 (FIG. 1) that associates bags with insertable threats and vice-versa. More preferably, the controller 104 maintains a list of previously used threats, bags, and/or threat-bag combinations to further assist randomization. This may be particularly useful in human screener training to ensure that novel bag images are presented. One example implementation includes storing a Boolean value in the database 108 with each stored threat, bag, or both. Still further, additional values in the database 108 may be generated each instance a threat gets inserted into a bag in accordance with the present disclosure. The controller 104 may then utilize this data to avoid previously utilized combinations of bag and threat when generating additional images.

In operation 606, the controller 104 selects an insertable CCL subvolume for the target bag selected in operation 604, and preferably, a random insertable CCL subvolume. Preferably, the controller 104 utilizes the map of threats and insertable subvolumes determined in operation 508 of FIG. 5 to select the insertable CCL subvolume in operation 606.

In operation 608, the controller 104 aligns the selected target threat with the selected CCL subvolume. This can include the controller 104 aligning the eigendirection with the maximum/greatest Eigenvalue of the selected threat with the equivalent/corresponding eigendirection in the selected CCL subvolume.

Figure 24:
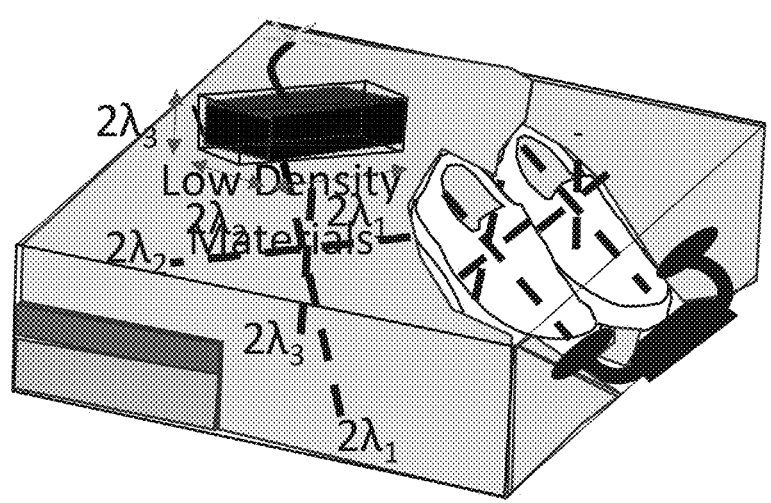
FIG. 24 shows one example approach to insertion of threats into a target CCL subvolume of a bag consistent with aspects of the present disclosure.

Note, based on the list of insertable threats into the large volume of a sparsely packed package or bag (such as shown in FIG. 24), the present disclosure recognizes that not only can each of the threats potentially fit into the large volume but that they are each potentially substantially smaller than the dimensions of the volume into which they are going to be inserted. As a result, the controller 104 can position the center of mass of any selected threat at the center of mass of the void volume and translate and rotate to the threat to positions/orientations within the void volume such that it preferably remains inside the void volume. These positions can be defined by the difference in the dimensions of the threat relative to the target volume. Specific threat eigendirections can be aligned with volume/void eigendirections and can be used to determine viable positional movements and rotations, or other methods can be used to determine such movements and are within the scope of this disclosure. Insertion of the brick into the large void volume in the sparsely packed package or bag in the example of FIG. 24 is illustrated after translation of its center of mass from that of the void volume, and rotation of its eigen axes from those of the void volume, placing it in the corner of the package/bag.

Note, in the context of the process 600 being used for screener training (e.g., human screener training) it may be preferable to rotate the threat as necessary to bring the centroid of the threat to the lowest point within a target CCL subvolume relative to a horizontal plane intersecting the boundary of the threat. This may advantageously minimize or otherwise reduce a user detecting the resulting image as having a synthetic component.

In operation 610, the controller 104 determines one or more potential orientations of the selected threat within the selected CCL subvolume. This can include the controller 104 calculating the potential translation of the centroid of the selected threat from the centroid of the selected CCL subvolume, including rotations.

In operation 612, the controller 104 selects an orientation determined in operation 610 for the selected threat in the selected CCL subvolume, and preferably, randomly selects a determined orientation. Note, in the context of process 600 being used for screener training it may be preferable to move the position of the threat in the Z direction to the bottom/base of a target CCL subvolume to avoid a human detecting the presence of a synthetic component within the resulting image.

In operation 614, the controller 104 identifies the bounding ranges (e.g., X, Y, Z positions) of the selected target bag for threat bounding box of selected target threat.

In operation 616, the controller 104 utilizes the bounding range of Z determined in operation 614 to select applicable bag slices for insertion.

In operation 618, the controller 104 then exacts, for each Z slice, the threat volume intersection. In operation 620, the controller 104 determines if the selected threat contains material above a threshold density (p) and/or Zeff. If the material exceeds the threshold, the process 600 continues to operation 622 to perform metal insertion, and if not, continues to operation 636 to perform normal/non-metal insertion.

In operation 622 (see FIG. 6C), the controller 104 applies a threshold to threat volume intersection for metal only, e.g., without artifacts.

In operation 624, the controller 104 thresholds the intersected bag slice for metal only, e.g., without artifacts.

In operation 626, the controller 104 transforms the threat intersection with the bag slice into the sinogram domain. A sinogram is the 2-D array of data containing the slices.

In operation 628, the controller 104 transforms the bag slice into the sinogram domain.

In operation 630, the controller multiplies the sinogram of the threat intersection with the sinogram of the bag slice. This can include operations as shown in the example process flow shown in FIG. 11.

In operation 632, the controller 104 integrates the image with threat and bag metal artifacts determined in operation 630.

In operation 634, the controller 104 optionally blends the image at the boundary/interfaces of the threat and containing CCL subvolume. The process 600 then ends.

Continuing to operation 636 (see FIG. 6D), the controller 104 integrates the bag slice with normal threat intersection.

In operation 638, the controller 104 integrates the image with threat and bag data.

In operation 640, the controller 104 optionally blends the image generated in operation 638 at the boundary of the threat and containing CCL subvolume.

Figure 7:
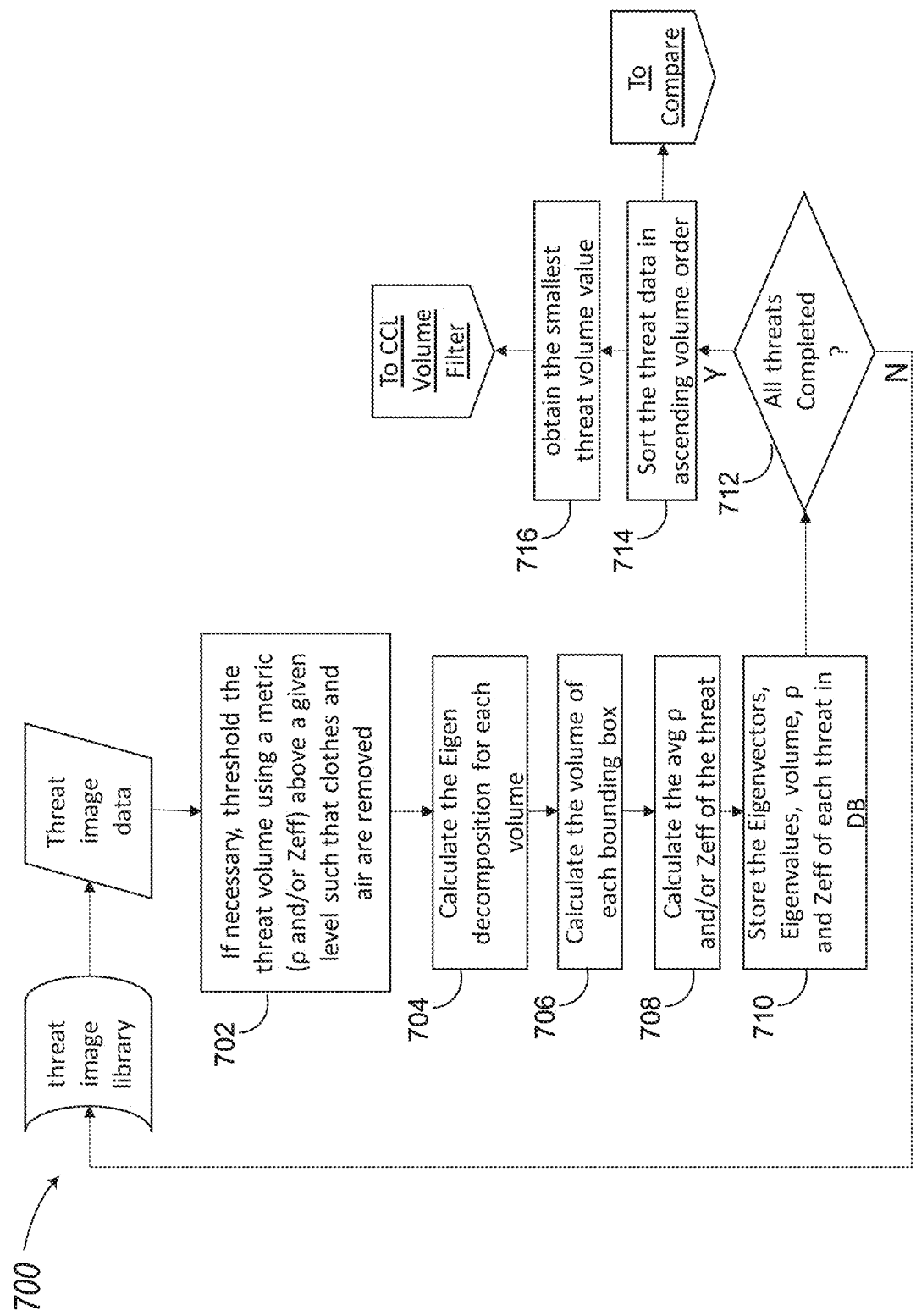
FIG. 7 illustrates one example flow chart of an algorithm for analyzing a plurality of threat images consistent with aspects of the present disclosure.

FIG. 7 illustrates an example flow chart of an algorithm of workflow 700 for analyzing a plurality of threat images, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 7 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 702, the controller 104 retrieves threat image data from a threat image library and, if necessary, applies a predetermined threshold to the threat volume using a metric (p and/or Zeff) above a given level such that clothes and air are removed.

In operation 704, the controller 104 determines the Eigen decomposition for each volume.

In operation 706, the controller 104 determines the volume of each bounding box.

In operation 708, the controller 104 determines the avg $\rho$ and/or Zeff of the threat.

In operation 710, the controller 104 stores the Eigenvectors, Eigenvalues, volume, $\rho$ and Zeff of each threat in DB, where DB is a table of threat ID number, type, eigenvectors, eigenvalues, volume, $\rho$, and Zeff are stored.

In decision block 712, the controller 104 determines if all threats have been completed. If the controller 104 determines that all threats have been completed ("yes" branch, decision block 712), then the controller 104 proceeds to operation 714. If the controller 104 determines that all threats have not been completed ("no" branch, decision block 712), then the controller 104 returns to operation 702 to retrieve the next threat image data from the threat image library.

In operation 714, the controller 104 sorts the threat data in ascending volume order.

In operation 716, the controller 104 sorts obtain the smallest threat volume value. The controller 104 then proceeds to the CCL volume filter.

Figure 8:
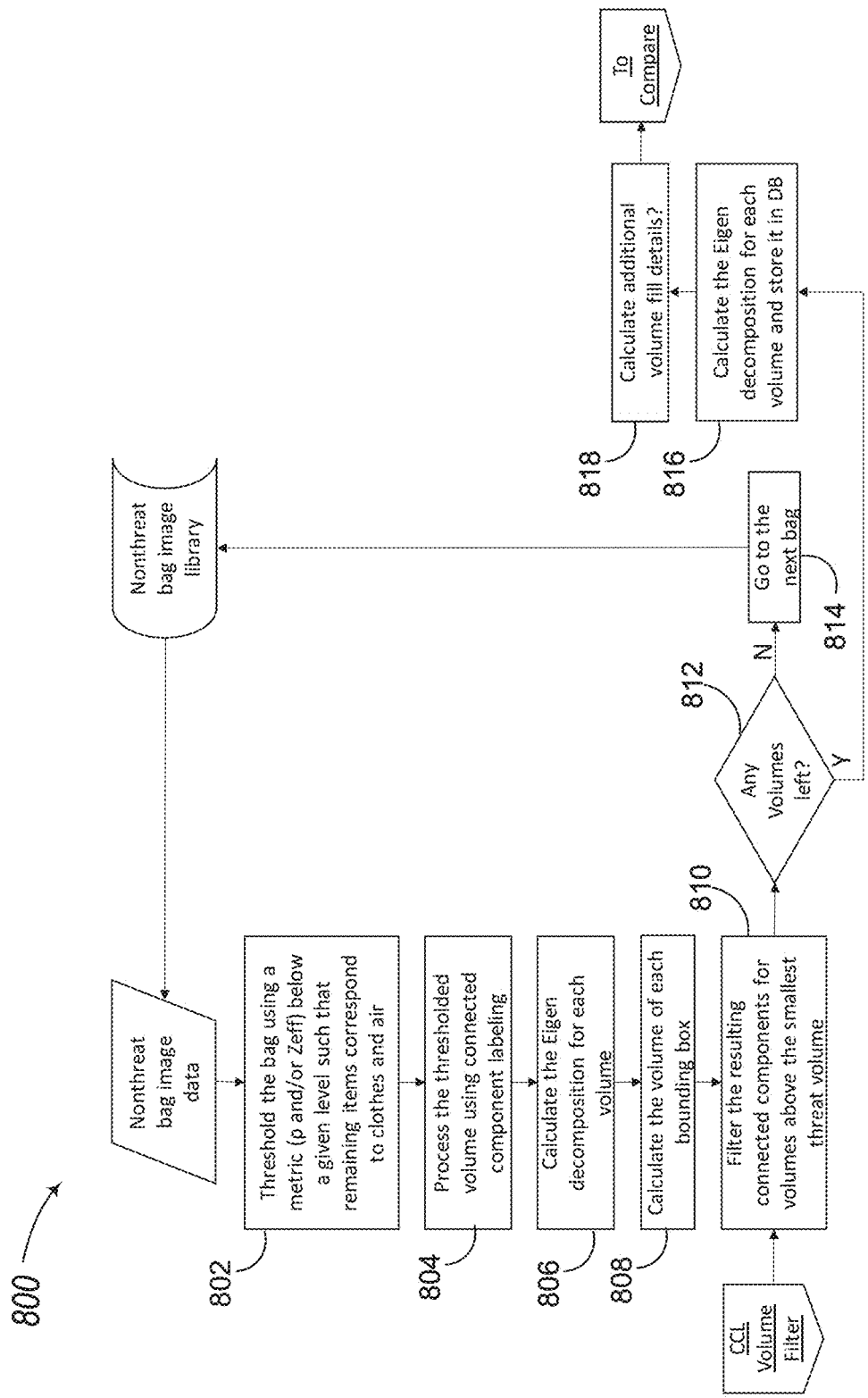
FIG. 8 illustrates one example flow chart of an algorithm for analyzing a plurality of non-threat bag images consistent with aspects of the present disclosure.

FIG. 8 illustrates an example flow chart of an algorithm of workflow 800 for analyzing a plurality of non-threat bag images, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 8 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 802, the controller 104 retrieves non-threat bag image data from a non-threat bag image library and, if necessary, applies a predetermined threshold to the threat volume using a metric (p and/or Zeff) below a given level such that remaining items correspond to clothes and air.

In operation 804, the controller 104 processes the thresholded volume using connected component labeling.

In operation 806, the controller 104 determines the Eigen decomposition for each volume.

In operation 808, the controller 104 determines the volume of each bounding box.

In operation 810, the controller 104 filters the resulting connected components for volumes above the smallest threat volume.

In decision block 812, the controller 104 determines if there are any volumes remaining. If the controller 104 determines that there are any volumes remaining ("yes" branch, decision block 812), then the controller 104 proceeds to operation 816. If the controller 104 determines that there are no volumes remaining ("no" branch, decision block 812), then the controller 104 proceeds to operation 814 to retrieve the next nonthreat bag image from the non-threat image library.

In operation 814, the controller 104 retrieve the next nonthreat bag image from the non-threat image library. The controller then returns to operation 802 to process the next non-threat bag image.

In operation 816, the controller 104 determines the Eigen decomposition for each volume and stores it in the DB.

In operation 818, the controller 104 determines additional volume fill details. The controller 104 then proceeds to the Compare procedure in FIG. 9.

Figure 9:
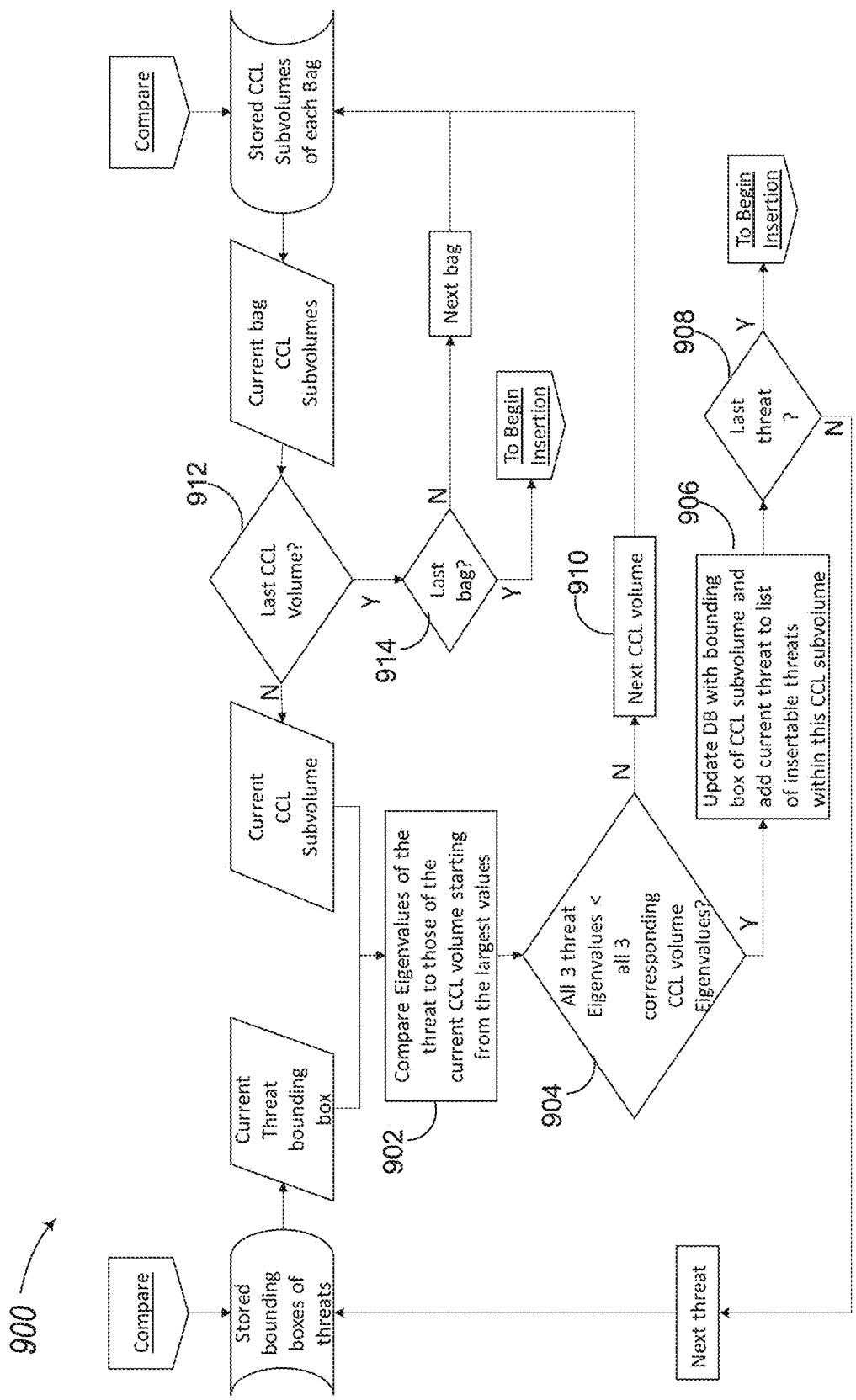
FIG. 9 illustrates an example flow chart of an algorithm for identifying bags with insertable connected component labeling (CCL) subvolumes based on a plurality of threat images, in accordance with aspects of the present disclosure.

FIG. 9 illustrates an example flow chart of an algorithm of workflow 900 for analyzing a plurality of non-threat bag images, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 9 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 902, the controller 104 retrieves a current threat bounding box from the stored bounding boxes of threats and a current CCL subvolume from the stored CCL subvolumes of each bag and compares the Eigenvalues of the threat to those of the current CCL volume starting from the largest values.

In decision block 904, the controller 104 determines if all three threat Eigenvalues are less than all three corresponding CCL volume Eigenvalues. If the controller 104 determines that all three threat Eigenvalues are less than all three corresponding CCL volume Eigenvalues ("yes" branch, decision block 904), then the controller 104 proceeds to operation 906. If the controller 104 determines that all three threat Eigenvalues are not less than all three corresponding CCL volume Eigenvalues ("no" branch, decision block 904), then the controller 104 proceeds to operation 910 to retrieve the next CCL volume.

In operation 906, the controller 104 updates the DB with the bounding box of the CCL subvolume and adds the current threat to the list of insertable threats within this CCL subvolume.

In decision block 908, the controller 104 determines if there are any threats remaining. If the controller 104 determines that there are any threats remaining ("yes" branch, decision block 908), then the controller 104 proceeds to the Begin Insertion algorithm in FIG. 10A or FIG. 10B below. If the controller 104 determines that there are no threats remaining ("no" branch, decision block 908), then the controller 104 proceeds to operation 910 to retrieve the next CCL volume.

In operation 910, the controller 104 retrieve the next CCL subvolume from the stored CCL subvolumes of each bag.

In decision block 912, the controller 104 determines if this is the last CCL subvolume. If the controller 104 determines that this is the last CCL subvolume ("yes" branch, decision block 912), then the controller 104 proceeds to operation 914. If the controller 104 determines that this is not the last CCL subvolume ("no" branch, decision block 912), then the controller 104 returns to operation 902.

In decision block 914, the controller 104 determines if this is the last bag. If the controller 104 determines that this is the last bag ("yes" branch, decision block 914), then the controller 104 proceeds to the Begin Insertion algorithm in FIG. 10A or FIG. 10B below. If the controller 104 determines that this is not the last CCL subvolume ("no" branch, decision block 914), then the controller 104 selects the next bag and proceeds to decision block 912.

Figure 10A:
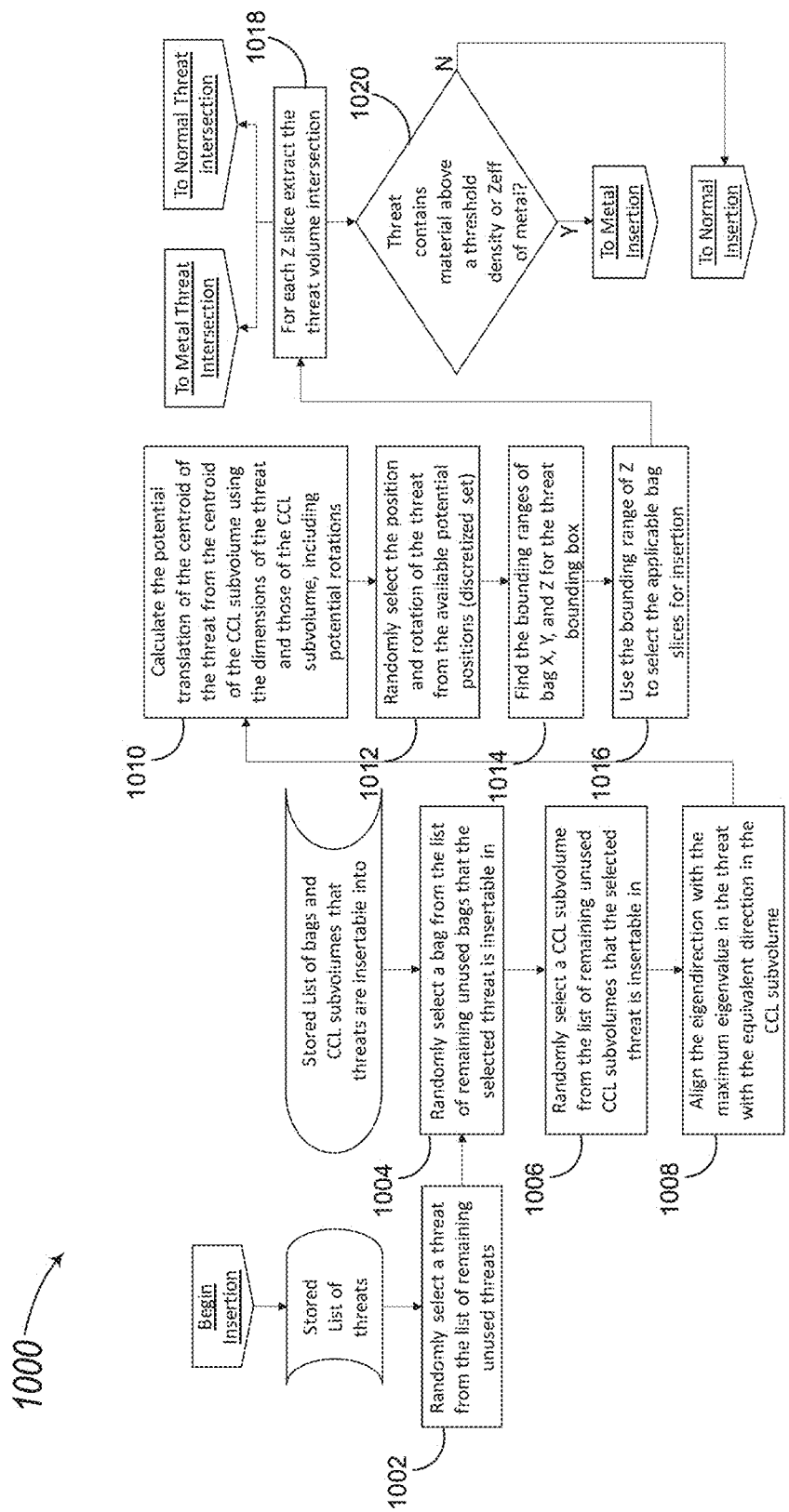
FIG. 10A illustrates an example flow chart of an algorithm for insertion of a threat from a threat image into a target bag image for purposes of machine learning/artificial intelligence training, in accordance with aspects of the present disclosure.

FIG. 10A illustrates an example flow chart of an algorithm of workflow 1000 for insertion of a threat from a threat image into a target bag image for purposes of machine learning/artificial intelligence training, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 10A provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 1002, the controller 104 randomly selects a threat from the list of remaining unused threats from the stored list of threats.

In operation 1004, the controller 104 randomly selects a bag into which the threat can be inserted from the list of remaining unused bags in the stored list of bags and CCL subvolumes that threats are insertable into.

In operation 1006, the controller 104 randomly selects a CCL subvolume from the list of remaining unused CCL subvolumes into which the selected threat can be inserted.

In operation 1008, the controller 104 aligns the eigendirection with the maximum eigenvalue in the threat with the equivalent direction in the CCL subvolume.

In operation 1010, the controller 104 determines the potential translation of the centroid of the threat from the centroid of the CCL subvolume using the dimensions of the threat and the dimensions of the CCL subvolume, including potential rotations.

In operation 1012, the controller 104 randomly selects the position and rotation of the threat from the available potential positions (discretized set).

In operation 1014, the controller 104 finds the bounding ranges of bag X, Y, and Z for the threat bounding box.

In operation 1016, the controller 104 uses the bounding range of Z to select the applicable bag slices for insertion.

In operation 1018, for each Z slice the controller 104 extracts the threat volume intersection.

In decision block 1020, the controller 104 determines if the threat contains material above a threshold density or Zeff of metal. If the controller 104 determines that the threat contains material above a threshold density or Zeff of metal ("yes" branch, decision block 1020), then the controller 104 proceeds to the Metal Insertion algorithm in FIG. 11 below. If the controller 104 determines that the threat does not contain material above a threshold density or Zeff of metal ("no" branch, decision block 1020), then the controller 104 performs normal insertion for the threat.

Figure 10B:
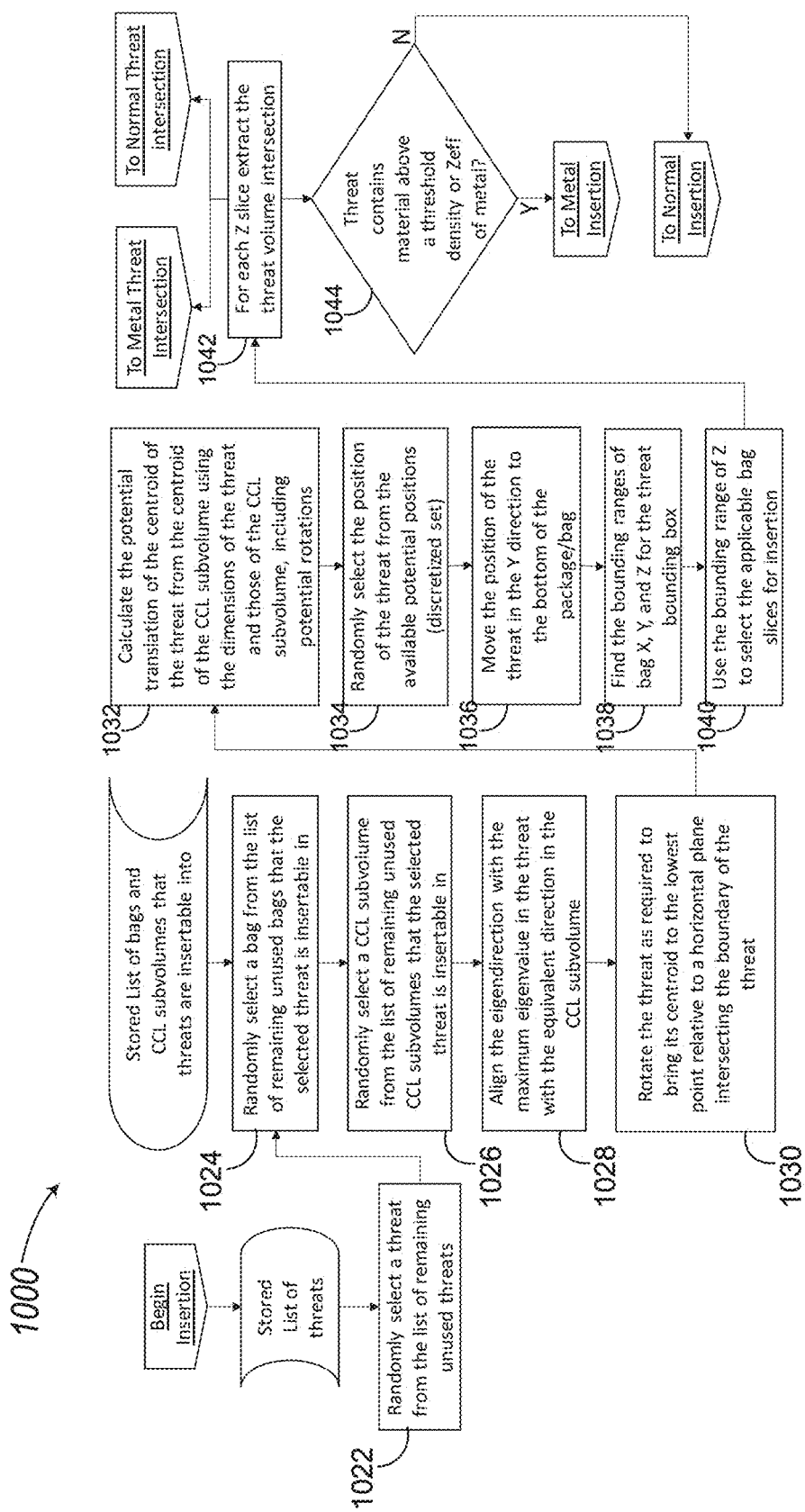
FIG. 10B illustrates another example flow chart of an algorithm for insertion of a threat from a threat image into a target bag image for purposes of (human) screener training, in accordance with aspects of the present disclosure.

FIG. 10B illustrates another example flow chart of an algorithm of workflow 1000 for insertion of a threat from a threat image into a target bag image for purposes of (human) screener training, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 10A provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 1022, the controller 104 randomly selects a threat from the list of remaining unused threats from the stored list of threats.

In operation 1024, the controller 104 randomly selects a bag into which the threat can be inserted from the list of remaining unused bags in the stored list of bags and CCL subvolumes that threats are insertable into.

In operation 1026, the controller 104 randomly selects a CCL subvolume from the list of remaining unused CCL subvolumes into which the selected threat can be inserted.

In operation 1028, the controller 104 aligns the eigendirection with the maximum eigenvalue in the threat with the equivalent direction in the CCL subvolume.

In operation 1030, the controller 104 rotates the threat as required to bring its centroid to the lowest point relative to a horizontal plane intersecting the boundary of the threat.

In operation 1032, the controller 104 determines the potential translation of the centroid of the threat from the centroid of the CCL subvolume using the dimensions of the threat and those of the CCL subvolume, including potential rotations.

In operation 1034, the controller 104 randomly selects the position of the threat from the available potential positions (discretized set).

In operation 1036, the controller 104 moves the position of the threat in the Y direction to the bottom of the package/bag.

In operation 1038, the controller 104 determines the bounding ranges of bag X, Y, and Z for the threat bounding box.

In operation 1040, the controller 104 uses the bounding range of Z to select the applicable bag slices for insertion.

In operation 1042, for each Z slice the controller 104 extracts the threat volume intersection.

In decision block 1044, the controller 104 determines if the threat contains material above a threshold density or Zeff of metal. If the controller 104 determines that the threat contains material above a threshold density or Zeff of metal ("yes" branch, decision block 1044), then the controller 104 proceeds to the Metal Insertion algorithm in FIG. 11 below. If the controller 104 determines that the threat does not contain material above a threshold density or Zeff of metal ("no" branch, decision block 1044), then the controller 104 performs normal insertion for the threat.

Figure 11:
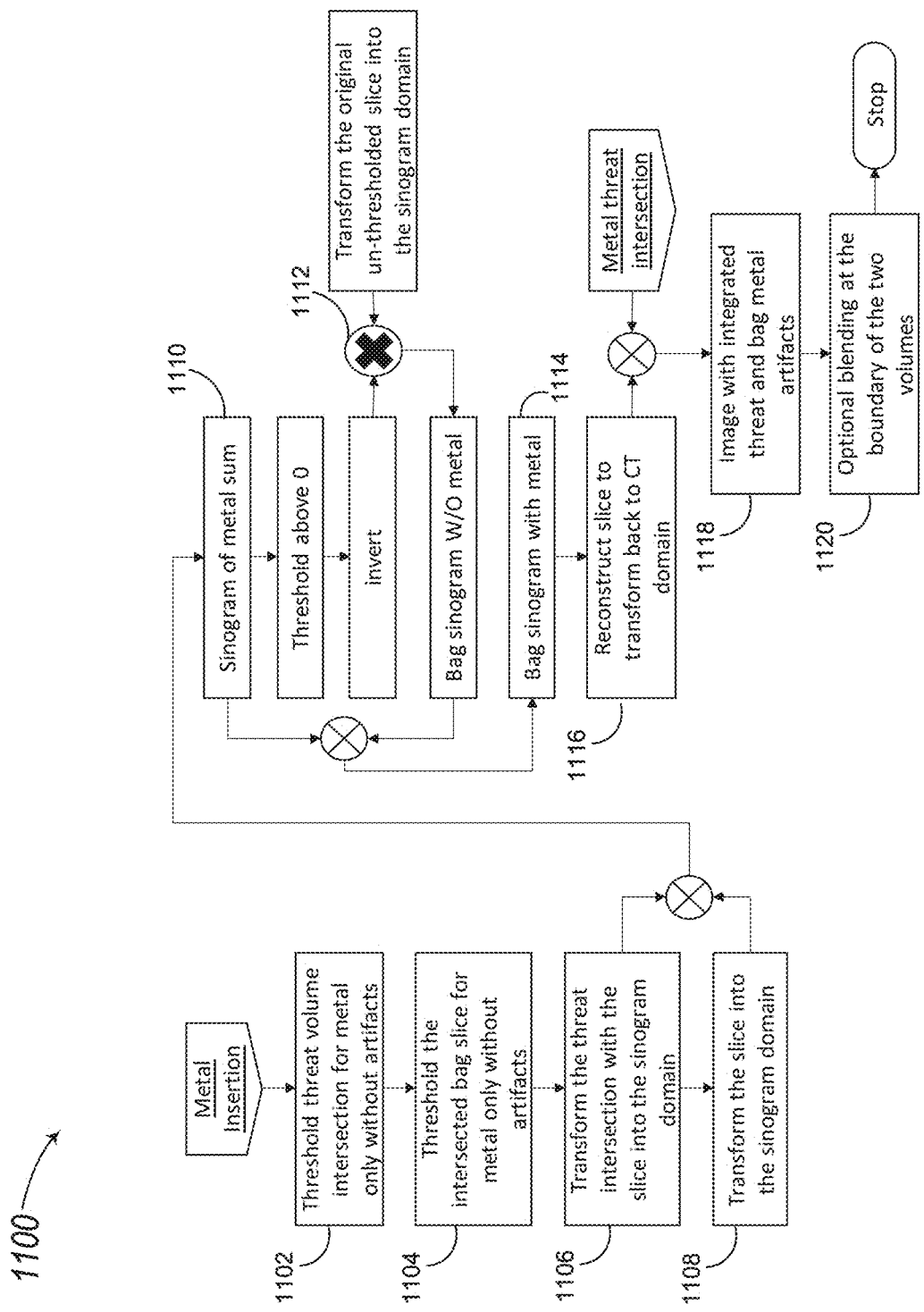
FIG. 11 illustrates another example flow chart of an algorithm for insertion of a metal threat into a target bag image, in accordance with aspects of the present disclosure.

FIG. 11 illustrates another example flow chart of an algorithm of workflow 1100 for insertion of a metal threat into a target bag image, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 11 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 1102, the controller 104 thresholds the threat volume intersection for metal only without artifacts.

In operation 1104, the controller 104 thresholds the intersected bag slice for metal only without artifacts.

In operation 1106, the controller 104 transforms the intersection of the threat with the slice into the sinogram domain.

In operation 1108, the controller 104 transforms the slice into the sinogram domain.

In operation 1110, the controller 104 determines the tensor product of the result of operation 1106 (the intersection of the threat with the slice into the sinogram domain) with the result of operation 1108 (the slice transformed into the sinogram domain) to determine the sinogram of the metal sum.

In operation 1112, if the threshold of the sinogram of the metal sum is above 0, then the controller 104 inverts the sinogram and determines the tensor product of the inverted vector with a transform of the original un-thresholded slice into the sinogram domain to determine a bag sinogram without metal.

In operation 1114, the controller 104 determines the tensor product of the value determined in operation 1110 (sinogram of the metal sum) with the value determined in operation 1114 (bag sinogram without metal) to determine the bag sinogram with metal.

In operation 1116, the controller 104 reconstructs the slice to transform back into the CT domain.

In operation 1118, the controller 104 determines the tensor product of the value from operation 1116 (the slice transformed back into the CT domain) with the metal threat intersection determined in either FIG. 10A or 10B above to create an image with integrated threat and bag metal artifacts.

In operation 1120, the controller 104 performs optional blending at the boundary of the two volumes.

Figure 12:
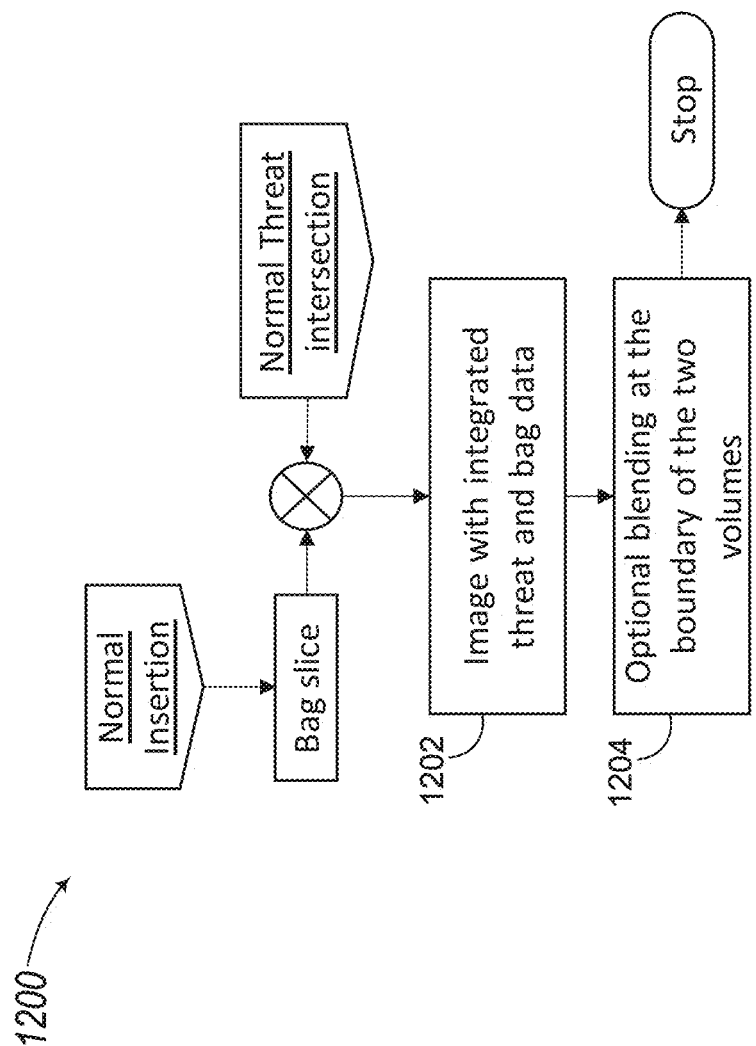
FIG. 12 illustrates another example flow chart of an algorithm for insertion of a normal/non-metal threat into a target bag image, in accordance with aspects of the present disclosure.

FIG. 12 illustrates another example flow chart of an algorithm of workflow 1200 for insertion of a normal/non-metal threat into a target bag image, in accordance with an embodiment of the present disclosure. It should be appreciated that embodiments of the present disclosure provide at least for generating a synthetic 3D X ray volume by inserting a 3D X ray volume of a first object into the 3D X ray volume of a second object. However, FIG. 12 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 1202, the controller 104 determines the tensor product bag slice of the normal insertion determined in either FIG. 10A or 10B above with the normal threat intersection determined in either FIG. 10A or 10B above to create an image with integrated threat and bag data.

In operation 1204, the controller 104 performs optional blending at the boundary of the two volumes.

Training of artificial intelligence (AI)/machine learning (ML) systems for identification and/or classification of threat-carrying bags do not necessarily require real time or fast insertion (thus, insertion+generation of threat-carrying bags can be performed over time or otherwise a desired rate); machine specific geometry to accurately model the physical interactions between bags and threats; accurate physical placement of threats (e.g., floating versus grounded threats). Systems and methods consistent with the present disclosure advantageously provide a generalized algorithm capable of placement of threats in both closed-top and open-top bags.

Screener training does require accurate physical placement of threats, i.e., grounded threats are required, because the screener can recognize physically implausible insertions. Screener training also requires accurate modeling of artifacts from inserted metal objects, again because the screener can recognize physically implausible insertions.

Aspects and features of the present disclosure are therefore well suited for generating images of threat-carrying bags for purposes of training AI/ML systems.

According to one aspect of the present disclosure, there is thus provided a system for generating a synthetic three-dimensional (3D) image. The system includes: a memory having a plurality of bag images and a plurality of threat images; one or more controllers; one or more non-transitory computer readable storage media; and program instructions stored on the one or more non-transitory computer readable storage media for execution by at least one of the one or more controllers. The stored program instructions including instructions to: determine a first bag image of the plurality of bag images that includes an associated bag subvolume greater than a volume of a threat represented in a first threat image of the plurality of threat images, and generate an image based on inserting the threat of the first threat image into the associated bag subvolume of the first bag image.

According to another aspect of the disclosure, there is provided a computer-implemented method for generating a synthetic three-dimensional (3D) image. The computer-implemented method includes: selecting, by one or more controllers, a first 3D X ray volume of a first object; and creating, by the one or more controllers, a synthetic 3D X ray volume by inserting a second 3D X ray volume of a second object into the first 3D X ray volume of the first object.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, a method, and/or a computer program product. The system or computer program product may include one or more non-transitory computer readable storage media having computer readable program instructions thereon for causing a processor to carry out aspects of the present disclosure.

The one or more non-transitory computer readable storage media can be any tangible device that can retain and store instructions for use by an instruction execution device. The one or more non-transitory computer readable storage media may be, for example, but is not limited to, an electronic storage device, a magnetic storage device, an optical storage device, an electromagnetic storage device, a semiconductor storage device, or any suitable combination of the foregoing. A non-exhaustive list of more specific examples of the one or more non-transitory computer readable storage media includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A one or more non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from one or more non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in one or more non-transitory computer readable storage media within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or other programmable logic devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in one or more non-transitory computer readable storage media that can direct a computer, a programmable data processing apparatus, and/or other devices to function in a particular manner, such that the one or more non-transitory computer readable storage media having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A system for generating a synthetic three-dimensional (3D) image, the system comprising:
    a memory having a plurality of bag images and a plurality of threat images;
    one or more controllers;
    one or more non-transitory computer readable storage media; and
    program instructions stored on the one or more non-transitory computer readable storage media for execution by at least one of the one or more controllers, the stored program instructions including instructions to:
        determine a threat image of the plurality of threat images having a smallest threat volume;
        determine at least one bag image of the plurality of bag images having a bag subvolume greater than the smallest threat volume;
        store in the memory a first identifier of the at least one bag image having the bag subvolume greater than the smallest threat volume;
        store an entry in a lookup table that maps the first identifier with a second identifier of at least one threat image of the plurality of threat images with a first threat volume less than the bag subvolume of the at least one bag image having the bag subvolume greater than the smallest threat volume;
        select a second bag image and a second threat image, the second bag image having the bag subvolume greater than a second threat volume of the second threat image based on the lookup table; and
        responsive to determining that the bag subvolume of the second bag image is greater than the second threat volume of the second threat image, create a new image based on inserting the second threat image into the first second bag image.

2. The system of claim 1, wherein the one or more controllers are configured to determine the at least one bag image of the plurality of bag images having the bag subvolume greater than the smallest threat volume based on connected component labeling (CCL).

3. The system of claim 1, wherein the one or more controllers are further configured to store in the memory an identifier of the at least one bag image of the plurality of bag images having the bag subvolume greater than the smallest threat volume.

4. The system of claim 3, wherein the one or more controllers are further configured to store in the memory an associated identifier of at least one bag subvolume for the at least one bag image of the plurality of bag images having the bag subvolume greater than the smallest threat volume.

5. The system of claim 1, wherein the one or more controllers are further configured to identify whether the second threat image contains a metal based on an associated threshold density or atomic number, and wherein the one or more controllers are further configured to generate an artifact image with integrated threat and metal artifacts based on the metal.

6. The system of claim 5, wherein the one or more controllers are further configured to output the artifact image with the integrated threat and the metal artifacts to a machine learning system.

7. The system of claim 1, wherein the one or more controllers are configured to determine a plurality of orientations for the second threat image within the second bag image.

8. The system of claim 7, wherein the one or more controllers are configured to randomly select an orientation of the plurality of orientations to generate the image.

9. The system of claim 1, wherein each of the plurality of threat images include a representation of a threat object, the threat object being an explosive device or a weapon.

10. The system of claim 1, wherein the plurality of bag images and the plurality of threat images comprise 3D image data.

11. The system of claim 1, wherein the plurality of threat images and the plurality of bag images comprise 3D image data captured by a 3D CT scanning device.

12. A computer-implemented method for generating a synthetic three-dimensional (3D) image comprising:

determining, by one or more controllers, a first 3D X-ray volume of a first object having a smallest object volume;

determining, by the one or more controllers, at least one second 3D X-ray volume of a second object having a subvolume greater than the smallest object volume;

storing, by the one or more controllers, an entry in a lookup table that maps a first identifier of the at least one second 3D X-ray volume of the second object with a second identifier of at least one object of a plurality of objects with a 3D X-ray volume less than the second 3D X-ray volume of the second object;

selecting, by the one or more controllers, a third object and a fourth object, the third object having a subvolume greater than a volume of the fourth object based on the lookup table; and creating, by the one or more controllers, a synthetic 3D X-ray image by inserting a third 3D X-ray volume of the third object into a fourth 3D X-ray volume of the fourth object.

13. The computer-implemented method of claim 12, wherein:

the fourth 3D X-ray volume of the fourth object is a bag image and the third 3D X-ray volume of the third object is a threat image, and a bag subvolume of the bag image is greater than a smallest threat volume.

14. The computer-implemented method of claim 13, further comprising:

determining, by the one or more controllers, a plurality of orientations for the threat image within the bag image.

15. The computer-implemented method of claim 13, wherein the lookup table associates the bag image with any threat image that is insertable into the bag image.

16. The computer-implemented method of claim 12, wherein creating the synthetic 3D X-ray image by inserting the third 3D X-ray volume of the third object into fourth 3D X-ray volume of the fourth object further comprises:

determining, by the one or more controllers, whether the third 3D X-ray volume of the third object contains a metal based on at least one of an associated average density and an atomic number; and creating, by the one or more controllers, the synthetic 3D X-ray image with artifacts based on the metal.

* * * * *